United States Patent
Kuo et al.

(10) Patent No.: US 11,447,670 B2
(45) Date of Patent: *Sep. 20, 2022

(54) CURABLE ACETOACETYLATED RESIN COMPOSITIONS COMPRISING ALDEHYDES AND CERTAIN BASIC CATALYSTS

(71) Applicant: Eastman Chemical Company, Kingsport, TN (US)

(72) Inventors: Thauming Kuo, Kingsport, TN (US); Nick Allen Collins, Fall Branch, TN (US); Terri Roxanne Carvagno, Church Hill, TN (US)

(73) Assignee: Eastman Chemical Company, Kingsport, TN (US)

( * ) Notice: Subject to any disclaimer, the term of this patent is extended or adjusted under 35 U.S.C. 154(b) by 392 days.

This patent is subject to a terminal disclaimer.

(21) Appl. No.: 16/705,331

(22) Filed: Dec. 6, 2019

(65) Prior Publication Data

US 2020/0181465 A1    Jun. 11, 2020

Related U.S. Application Data

(60) Provisional application No. 62/777,876, filed on Dec. 11, 2018, provisional application No. 62/777,865, (Continued)

(51) Int. Cl.
| | | |
|---|---|---|
| C09J 167/02 | (2006.01) | |
| C09J 171/00 | (2006.01) | |
| C08G 63/87 | (2006.01) | |
| C08G 63/91 | (2006.01) | |
| C09D 167/02 | (2006.01) | |
| C09D 7/20 | (2018.01) | |
| C08G 12/00 | (2006.01) | |
| C09D 161/20 | (2006.01) | |
| C09J 5/00 | (2006.01) | |
| C09J 161/20 | (2006.01) | |
| C09D 7/65 | (2018.01) | |
| C09J 11/08 | (2006.01) | |
| C08L 67/03 | (2006.01) | |
| C09J 167/03 | (2006.01) | |
| C08J 3/24 | (2006.01) | |
| C08J 7/043 | (2020.01) | |
| C08J 5/18 | (2006.01) | |
| C09D 167/00 | (2006.01) | |
| C09D 175/08 | (2006.01) | |
| C08G 63/00 | (2006.01) | |
| C08K 3/013 | (2018.01) | |
| C08K 5/00 | (2006.01) | |

(Continued)

(52) U.S. Cl.
CPC ............ C09J 167/02 (2013.01); C08G 12/00 (2013.01); C08G 63/005 (2013.01); C08G 63/87 (2013.01); C08G 63/916 (2013.01); C08J 3/24 (2013.01); C08J 5/18 (2013.01); C08J 7/043 (2020.01); C08L 67/03 (2013.01); C09D 7/20 (2018.01); C09D 7/65 (2018.01); C09D 161/20 (2013.01); C09D 167/00 (2013.01); C09D 167/02 (2013.01); C09D 175/08 (2013.01); C09J 5/00 (2013.01); C09J 11/08 (2013.01); C09J 161/20 (2013.01); C09J 167/03 (2013.01); C09J 171/00 (2013.01); C08J 2323/06 (2013.01); C08J 2323/12 (2013.01); C08J 2367/02 (2013.01); C08K 3/013 (2018.01); C08K 5/005 (2013.01); C08K 5/0016 (2013.01); C08K 5/0025 (2013.01); C08K 5/0066 (2013.01); C08K 5/07 (2013.01); C08K 5/18 (2013.01); C08K 5/3462 (2013.01); C09J 2461/00 (2013.01); C09J 2467/00 (2013.01)

(58) Field of Classification Search
CPC .... C09J 167/00; C09J 167/02; C09J 167/025; C09J 167/04; C09J 167/06; C09J 167/08
See application file for complete search history.

(56) References Cited

U.S. PATENT DOCUMENTS

| | | |
|---|---|---|
| 4,071,578 A | 1/1978 | Lasher |
| 4,708,821 A | 11/1987 | Shimokawa et al. |

(Continued)

FOREIGN PATENT DOCUMENTS

| | | |
|---|---|---|
| DE | 196 20 351 A1 | 11/1997 |
| EP | 0 161 697 A1 | 11/1985 |

(Continued)

OTHER PUBLICATIONS

"Photogenerated Base in Polymer Curing & Imaging: Radiation-induce Crosslinking via a Knoevenagel Reaction" authored by Urankar et al. and published in Polymer Preprints (1994) 35, 933-934.*

(Continued)

Primary Examiner — Marc S Zimmer
(74) Attorney, Agent, or Firm — C. Stuart Everett

(57) ABSTRACT

This invention relates to a curable adhesive composition comprising:

I. Component (I) comprising at least one amorphous or semi-crystalline polyester or at least one polyether or combinations thereof having at least one or at least two functional groups selected from the group consisting of β-ketoester and malonate functional groups, II. Component (II) comprising at least one or at least two aldehyde functional groups or isomers thereof, and III. Component (III) comprising at least one basic catalyst, salts thereof, or combinations thereof.

20 Claims, No Drawings

Related U.S. Application Data filed on Dec. 11, 2018, provisional application No. 62/777,871, filed on Dec. 11, 2018, provisional application No. 62/900,939, filed on Sep. 16, 2019, provisional application No. 62/916,503, filed on Oct. 17, 2019, provisional application No. 62/777,880, filed on Dec. 11, 2018.

(51) Int. Cl.
    *C08K 5/07*     (2006.01)
    *C08K 5/3462*   (2006.01)
    *C08K 5/18*     (2006.01)

(56) References Cited

U.S. PATENT DOCUMENTS

| | | | |
|---|---|---|---|
| 5,288,804 A | 2/1994 | Kim et al. | |
| 5,426,148 A | 6/1995 | Tucker | |
| 5,453,464 A | 9/1995 | Witzeman et al. | |
| 5,693,705 A | 12/1997 | Kubo et al. | |
| 6,117,492 A * | 9/2000 | Goldstein | D04H 1/587 |
| | | | 427/391 |
| 6,177,514 B1 | 1/2001 | Pathak et al. | |
| 6,521,716 B1 | 2/2003 | Leake | |
| 6,683,132 B1 | 1/2004 | Schick et al. | |
| 8,653,174 B2 | 2/2014 | Anderson et al. | |
| 8,664,333 B2 | 3/2014 | Shibutani et al. | |
| 8,962,725 B2 | 2/2015 | Brinkhuis et al. | |
| 9,181,452 B2 | 11/2015 | Brinkhuis et al. | |
| 9,181,453 B2 | 11/2015 | Brinkhuis et al. | |
| 9,260,626 B2 | 2/2016 | Brinkhuis et al. | |
| 9,284,423 B2 | 3/2016 | Brinkhuis et al. | |
| 9,534,081 B2 | 1/2017 | Brinkhuis et al. | |
| 9,587,138 B2 | 3/2017 | Brinkhuis et al. | |
| 9,599,602 B2 | 3/2017 | Kevil et al. | |
| 10,563,040 B2 * | 2/2020 | Kuo | C09D 167/02 |
| 11,261,359 B2 | 3/2022 | Boggs et al. | |
| 2002/0040093 A1 | 4/2002 | Hobel et al. | |
| 2002/0161162 A1 | 10/2002 | Kumar et al. | |
| 2003/0060655 A1 | 3/2003 | Hayashi et al. | |
| 2003/0195304 A1 | 10/2003 | Kuo et al. | |
| 2003/0195305 A1 | 10/2003 | Kuo et al. | |
| 2005/0081994 A1 | 4/2005 | Beckley et al. | |
| 2007/0048337 A1 | 3/2007 | Arthur | |
| 2008/0135060 A1 | 6/2008 | Kuo et al. | |
| 2009/0253865 A1 | 10/2009 | Shibutani et al. | |
| 2010/0204401 A1 | 8/2010 | Marsh et al. | |
| 2011/0015343 A1 | 1/2011 | Jones et al. | |
| 2012/0220676 A1 | 8/2012 | Moens | |
| 2013/0036939 A1 | 2/2013 | Webster et al. | |
| 2013/0233739 A1 | 9/2013 | Zhao et al. | |
| 2015/0024195 A1 | 1/2015 | Bammel et al. | |
| 2016/0068707 A1 | 3/2016 | Drijfhout | |
| 2016/0115345 A1 | 4/2016 | Kuo et al. | |
| 2016/0115347 A1 | 4/2016 | Kuo et al. | |
| 2016/0137877 A1 | 5/2016 | Kuo et al. | |
| 2016/0297994 A1 | 10/2016 | Kuo et al. | |
| 2017/0275492 A1 | 9/2017 | Zhou et al. | |
| 2018/0251656 A1 | 9/2018 | Geodegebuure et al. | |
| 2020/0140693 A1 | 5/2020 | Gessner et al. | |
| 2020/0181311 A1 | 6/2020 | Carvagno et al. | |
| 2020/0181312 A1 | 6/2020 | Dougherty et al. | |
| 2020/0181324 A1 | 6/2020 | Dougherty et al. | |
| 2020/0181395 A1 | 6/2020 | Dougherty et al. | |
| 2020/0181465 A1 | 6/2020 | Kuo et al. | |

FOREIGN PATENT DOCUMENTS

| | | |
|---|---|---|
| EP | 0 687 716 A1 | 12/1995 |
| EP | 1 435 383 A1 | 7/2004 |
| GB | 1 154 725 A | 6/1969 |
| JP | S56 5847 A | 1/1981 |
| JP | 3-284984 A * | 12/1991 |
| JP | H07331133 A | 12/1995 |
| JP | H11310723 A | 11/1999 |
| JP | 3386577 A | 3/2003 |
| WO | WO 96/41833 A1 | 12/1996 |
| WO | WO 2017/186899 A1 | 11/2017 |

OTHER PUBLICATIONS

Co-pending U.S. Appl. No. 15/621,323, filed Jun. 13, 2017; Kuo et al.
Office Action dated Feb. 25, 2019 received in co-pending U.S. Appl. No. 15/621,323.
Office Action dated Jul. 15, 2019 received in co-pending U.S. Appl. No. 15/621,323.
Notice of Allowance dated Oct. 24, 2019 received in co-pending U.S. Appl. No. 15/621,232.
Co-pending U.S. Appl. No. 16/705,338, filed Dec. 6, 2019; Carvagno et al.
Co-pending U.S. Appl. No. 16/705,345, filed Dec. 6, 2019; Dougherty et al.
Co-pending U.S. Appl. No. 16/705,351, filed Dec. 6, 2019; Dougherty et al.
Co-pending U.S. Appl. No. 16/705,365, filed Dec. 6, 2019; Boggs et al.
Co-pending U.S. Appl. No. 16/705,377, filed Dec. 6, 2019; Dougherty et al.
Co-pending U.S. Appl. No. 16/705,394, filed Dec. 6, 2019; Collins et al.
Co-pending U.S. Appl. No. 16/705,324, filed Dec. 6, 2019; Kuo et al.
ASTM D1003; Standard Test Method for Haze and Luminous Transmittance of Transparent Plastics.
ASTM D2578; Standard Test Method for Wetting Tension of Polyethylene and Polypropylene Films.
ASTM D3236; Standard Test Method for Apparent Viscosity of Hot Melt Adhesives and Coating Materials.
ASTM D3985; Standard Test Method for Oxygen Gas Transmission Rate Through Plastic Film and Sheeting Using a Coulometric Sensor.
ASTM D4366; Standard Test Method for Hardness of Organic Coatings by Pendulum Damping Tests.
ASTM D4752-10; Standard Practice for Measuring MEK Resistance of Ethyl Silicate (Inorganic) Zinc-Rich Primers by Solvent Rub.
ASTM D5402; Standard Practice for Assessing the Solvent Resistance of Organic Coatings Using Solvent Rubs.
ASTM D6493-11; Standard Test Methods for Softening Point of Hydrocarbon Resins and Rosin Based Resins by Automated Ring-and-Ball Apparatus.
ASTM D7253-16; Standard Test Method for Polyurethane Raw Materials: Determination of Acidity as Acid Number for Polyether Polyols.
ASTM D974; Standard Test Method for Acid and Base Number by Color-Indicator Titration.
ASTM E222-17; Standard Test Methods for Hydroxyl Groups Using Acetic Anhydride Acetylation.
ASTM F1249; Standard Test Method for Water Vapor Transmission Rate Through Plastic Film and Sheeting Using a Modulated Infrared Sensor.
ASTM F2622; Standard Test Method for Oxygen Gas Transmission Rate Through Plastic Film and Sheeting Using Various Sensors.
ASTM G155; Standard Practice for Operating Xenon Arc Light Apparatus for Exposure of Non-Metallic Materials.
Blank et al.; "Delayed (Latent) Catalysis in Coatings;" www.researchgate.net/publication/228420884.
Brinkhuis et al.; "Taming the Michael Addition reaction;" European Coatings Journal; 05; 2015; pp. 34-40.
Dow Coating Materials; "Advances in 2K ISO-Free[1] Urethane Coating Technology;" May 19, 2015; pp. 1-30.
Invitation to Pay Additional Fees dated Aug. 23, 2018 received in International Application No. PCT/US2018/036237.
Noomen; "Applications of Michael addition chemistry in coatings technology"; Progress in Organic Coatings; 32; (1997); pp. 137-142.

(56) References Cited

OTHER PUBLICATIONS

Notification of Transmittal of the International Search Report and the Written Opinion of the International Searching Authority dated Aug. 24, 2018 for International Application No. PCT/US2018/036244.
Notification of Transmittal of the International Search Report and the Written Opinion of the International Searching Authority dated Nov. 6, 2018 for International Application No. PCT/US2018/036237.
Notification of Transmittal of the International Search Report and the Written Opinion of the International Searching Authority dated Feb. 24, 2020 for International Application No. PCT/US2018/060816.
Notification of Transmittal of the International Search Report and the Written Opinion of the International Searching Authority dated Feb. 25, 2020 for International Application No. PCT/US19/64868.
Notification of Transmittal of the International Search Report and the Written Opinion of the International Searching Authority dated Apr. 7, 2020 for International Application No. PCT/US19/64870.
Wicks et al.; "Chapter 13—Polyester Resins"; Organic Coatings Science and Technology; 2nd ed.; pp. 246-257; Wiley, New York, 1999.
Witzeman et al.; "Comparison of Methods for the Preparation of Acetoacetylated Coating Resins"; Journal of Coatings Technology; vol. 62; No. 789; pp. 101-112 (1990).
Yamamoto et al.; "Iridium-Catalyzed Oxidative Methyl Esterification of Primary Alcohols and Diols with Methanol;" Journal of Organic Chemistry; vol. 76; No. 8; Apr. 15, 2011; pp. 2937-2941.
Notification of Transmittal of the International Search Report and the Written Opinion of the International Searching Authority dated Mar. 20, 2020 for International Application No. PCT/US2019/064872.
Notification of Transmittal of the International Search Report and the Written Opinion of the International Searching Authority dated Mar. 20, 2020 for International Application No. PCT/US2019/064878.
Notification of Transmittal of the International Search Report and the Written Opinion of the International Searching Authority dated Mar. 20, 2020 for International Application No. PCT/US2019/064883.
Notification of Transmittal of the International Search Report and the Written Opinion of the International Searching Authority dated Mar. 20, 2020 for International Application No. PCT/US2019/064893.
Co-pending U.S. Appl. No. 17/309,118, filed Apr. 27, 2021; Kuo et al.
Co-pending U.S. Appl. No. 17/309,121, filed Apr. 27, 2021; Kuo et al.
Office Action dated Mar. 17, 2022 received in co-pending U.S. Appl. No. 16/705,338.
Non-Final Office Communication dated Jun. 9, 2021 received in U.S. Appl. No. 16/705,365.
Notice of Allowance and Fee(s) Due dated Oct. 22, 2021 received in U.S. Appl. No. 16/705,365.
Office Action dated Mar. 17, 2022 received in co-pending U.S. Appl. No. 16/705,377.
Office Communication dated Jun. 14, 2021 received in U.S. Appl. No. 16/705,324.
Office Communication dated Jan. 7, 2022 received in U.S. Appl. No. 16/705,324.
Notification of Transmittal of the International Search Report and the Written Opinion of the International Searching Authority with dated Jun. 2, 2020 for International Application No. PCT/US2019/064876.
USPTO Office Action dated Jun. 9, 2022 received in co-pending U.S. Appl. No. 16/705,394.
USPTO Office Action dated May 11, 2022 received in co-pending U.S. Appl. No. 16/705,324.

\* cited by examiner

CURABLE ACETOACETYLATED RESIN COMPOSITIONS COMPRISING ALDEHYDES AND CERTAIN BASIC CATALYSTS

CROSS-REFERENCE TO RELATED APPLICATIONS

This application claims the benefit of U.S. Provisional Application Nos. 62/777,876, 62/777,865, 62/777,871, 62/777,880 all filed Dec. 11, 2018; 62/900,939 filed Sep. 16, 2019; and 62/916,503 filed Oct. 17, 2019 under 35 U. S. C. § 119(e)(1); the entire contents of the provisional applications are hereby incorporated by reference.

FIELD OF THE INVENTION

This invention relates to low temperature curing reactive adhesive compositions. More particularly this invention provides polyester compositions having two or more beta-ketoester groups that are curable with compounds having aldehyde functionality at low temperatures to form higher molecular weight networks. Formulations based on such polyesters and aldehyde compounds are especially suitable for low-temperature curing adhesive applications without the use of isocyanates.

BACKGROUND OF THE INVENTION

Thermosetting compositions based on isocyanate cross-linkers are widely used for coating and adhesive applications. Such systems are curable at room temperature or low temperatures (e.g. <100° 0) and are capable of providing the desirable properties for a variety of applications.

However, there have been increasing health concerns associated with the production and the use of isocyanate compounds and the formulations based on isocyanates. Thus, there is a need for a crosslinking system that is isocyanate free. Further, it is desirable the system not generate by-products upon curing, which can be detrimental to film formation or other desirable properties. Isocyanate crosslinkers are generally used for low-temperature curing. New commercially viable systems that can target replacement of isocyanate systems would preferably be curable at a wide range of temperatures, e.g., including ambient temperatures. This is particularly challenging because organic reactions generally require the use of heat to overcome the energy that is needed for the reactions to occur. Thus, there is a need in the art for curable adhesive compositions that are isocyanate free, curable at a wide range of temperatures, including high and low temperatures, has no Volatile Components, e.g., Volatile Organic Components (VOCs), or has low Volatile Components, e.g., VOCs, released before, during, and/or after curing, and is suitable for a wide variety of applications.

SUMMARY OF THE INVENTION

This invention discloses a variety of adhesives compositions based on beta-ketoester functional polyesters. The present invention addresses the need for properties in adhesives compositions for one or more of the following desirable properties: isocyanate free, adequate cure time, e.g., curable at a wide range of temperatures including low and high temperatures, hydrolytic stability, thermal stability, solvent resistance, chemical resistance, weatherability, and reduced volatile compounds.

For the ease of reference but not intending to be limiting in any way, certain aspects of this disclosure are numbered consecutively, as follows.

In aspect 1 of this invention, there is provided a curable composition comprising:
  I. Component (I) comprising at least one amorphous or semi-crystalline polyester or at least one polyether having at least one or at least two functional groups selected from the group consisting of β-ketoester and malonate functional groups,
  II. Component (II) comprising at least one or at least two aldehyde functional groups or isomers thereof, and
  III. Component (III) comprising at least one basic catalyst, salts thereof, or combinations thereof.

In aspect 2 of this invention, there is provided a curable adhesive composition comprising:
  I. Component (I) comprising at least one amorphous or semi-crystalline polyester or at least one polyether or combinations thereof having at least one or at least two functional groups selected from the group consisting of β-ketoester and malonate functional groups,
  II. Component (II) comprising at least one or at least two aldehyde functional groups or isomers thereof, and
  III. Component (III) comprising at least one basic catalyst, salts thereof, or combinations thereof.

In aspect 3 of this invention, there is provided a curable composition comprising:
  I. Component (I) comprising at least one amorphous or semi-crystalline polyester or at least one polyether or combinations thereof having at least one or at least two functional groups selected from the group consisting of β-ketoester and malonate functional groups,
  II. Component (II) comprising at least one or at least two aldehyde functional groups or isomers thereof, and
  III. Component (III) comprising at least one tertiary amine, salts thereof, or combinations thereof.

In aspect 4 of this invention, there is provided a curable adhesive composition of any of aspects 1-3 comprising:
  I. Component (I) comprising at least one amorphous or semi-crystalline polyester or at least one polyether or combinations thereof having at least two functional groups selected from the group consisting of β-ketoester and malonate functional groups,
  II. Component (II) comprising at least two aldehyde functional groups or isomers thereof, and
  III. Component (III) comprising at least one tertiary amine, salts thereof, or combinations thereof.

In aspect 5 of this invention, there is provided the curable adhesive composition of any of aspects 1-4, wherein said polyester (I) is an acetoacetate functional polyester comprising the residues of
  a. a hydroxyl component comprising:
    i. a diol in an amount ranging from 50 to 100 mole %, based on the total moles of (i) and (ii) equaling 100 mole %; and
    ii. a polyol in an amount ranging from 0 to 50 mole %, based on the total moles of (i) and (ii) equaling 100 mole %;
  b. a carboxyl component comprising a polycarboxylic acid compound, a derivative of polycarboxylic acid compound, or a combination thereof; and
  c. an alkyl acetoacetate, a diketene, or a combination thereof in an amount ranging from about 5 to about 50 weight %, based on the total weight of (a), (b), and (c).

In aspect 6 of this invention, there is provided a curable adhesive composition comprising at least one polyester of aspect 5, wherein the diol component (a)(i) is in an amount ranging from about 60 to about 95 mole %.

In aspect 7 of this invention, there is provided a curable adhesive composition comprising at least one polyester of aspects 5 or 6, wherein the polyol component is in an amount ranging from about 5 to about 40 mole %.

In aspect 8 of this invention, there is provided a curable adhesive composition comprising any one of aspects 5-7, wherein the alkyl acetoacetate is an amount ranging from about 10 to about 40 weight %.

In aspect 9 of this invention, there is provided a curable adhesive composition comprising any one of aspects 5-8, wherein the diol component (a)(i) is one or more selected from the group consisting of 2,2-dimethyl-1,3-propanediol (neopentyl glycol), 2-methyl-1,3-propanediol (MPD), tricyclodecanedimethanol, 2-butyl-2-ethyl-1,3-propanediol, 1,4-butanediol, 1,6-hexanediol (HD), 1,2-cyclohexanedimethanol, 1,3-cyclohexanedimethanol, 1,4-cyclohexanedimethanol (CHDM) 2,2,4-trimethyl-1,3-pentanediol, hydroxypivalyl hydroxypivalate, 2,2,4,4-tetramethylcyclobutane-1,3-diol (TMCD), ethylene glycol, diethylene glycol, triethylene glycol, polyethylene glycol (PEG), isomers thereof or combinations thereof.

In aspect 10 of this invention, there is provided a curable adhesive composition comprising any one of aspects 5-9, wherein the polyol component is selected from can be 1,1,1-trimethylolpropane, 1,1,1-trimethylolethane, glycerin, sorbitol, pentaerythritol, triisocyanates, sucrose, and/or aliphatic or aromatic glycols, or combinations thereof.

In aspect 11 of this invention, there is provided a curable adhesive composition comprising any one of aspects 5-10, wherein the polyol component is selected from can be selected from 1,1,1-trimethylolpropane, 1,1,1-trimethylolethane, glycerin, sorbitol, and pentaerythritol or mixtures thereof.

In aspect 12 of this invention, there is provided a curable adhesive composition comprising any one of aspects 5-11, wherein the carboxyl component (b) is one or more selected from the group consisting of at least one carboxyl component selected from the group consisting of adipic acid, isophthalic acid (or dimethyl isophtalate), terephthalic acid, dimethyl terephthalate, 1,4-cyclohexanedicarboxylic acid, 1,3-cyclohexanedicarboxylic acid, tetrahydrophthalic anhydride, tetrahydrophthalic acid, hexahydrophthalic acid, hexahydrophthalic anhydride, maleic anhydride, succinic anhydride, phthalic acid, and phthalic anhydride, or mixtures thereof.

In aspect 13 of this invention, there is provided a curable adhesive composition comprising any one of aspects 1-12 wherein the alkyl acetoacetate can be selected from t-butyl acetoacetate, methyl acetoacetate, ethyl acetoacetate, n-propyl acetoacetate, isopropyl acetoacetate, n-butyl acetoacetate, isobutyl acetoacetate, t-amyl acetoacetate, diisopropyl carbinol acetoacetate, or mixtures thereof.

In aspect 14 of this invention, there is provided a curable adhesive composition comprising any one of aspects 1-13 wherein Component (I) has a glass transition temperature (Tg) of about −45° C. to about −10° C.

In aspect 15 of this invention, there is provided a curable adhesive composition comprising any one of aspects 1-14 comprising one or more organic solvents.

In aspect 16 of this invention, there is provided a curable adhesive composition comprising any one of aspects 1-15 selected from the group comprising ethyl acetate, butyl acetate, xylene, methyl amyl ketone, methyl ethyl ketone, and toluene.

In aspect 17 this invention, there is provided a curable adhesive composition comprising any one of aspects 1-16 wherein the Component (II) is a dialdehyde.

In aspect 18 of this invention, there is provided a curable composition comprising any one of aspects 1-17 wherein Component (III) can be selected from one or more of from the group consisting of 1,8-diazabicyclo-[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7-triazabicyclo[4.4.0]dec-5-ene (MTBD), 1,1,3,3-tetramethylguanidine (TMG), 1,4-diazabicyclo[2.2.2]octane (DABCO), triethylamine, N,N-dimethylethanolamine, ammonium hydroxide, triphenyl phosphine, and tributyl phosphine.

In aspect 19 of this invention, there is provided a curable adhesive composition comprising any one of aspects 1-18 wherein the basic catalyst is one or more selected from the group consisting of 1,8-diazabicyclo-[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7-triazabicyclo[4.4.0]dec-5-ene (MTBD), 1,1,3,3-tetramethylguanidine (TMG), 1,4-diazabicyclo[2.2.2]octane (DABCO), triethylamine, N,N-dimethylethanolamine, ammonium hydroxide, triphenyl phosphine, and tributyl phosphine.

In aspect 20 of this invention, there is provided a curable adhesive composition of any of aspects 1-17 comprising at least one tertiary amine which can be selected from at least one of 1,8-diazabicyclo-[5.4.0]undec-7-ene, 1,5-diazabicyclo[4.3.0]non-5-ene, 1,5,7-triazabicyclo[4.4.0]dec-5-ene, 7-methyl-1,5,7-triazabicyclo[4.4.0]dec-5-ene, and 1,1,3,3-tetramethylguanidine, 1,4-diazabicyclo[2.2.2]octane, triethylamine and N,N-dimethylethanolamine, or combinations thereof.

In aspect 21 of this invention, there is provided a curable adhesive composition comprising any one of aspects 1-20 wherein the basic catalyst is used in an amount ranging from 0.5 to 5 weight % based on the total weight of Components (I) and (II).

In aspect 22 of this invention, there is provided a curable composition comprising any one of aspects 1-21 wherein the acetoacetate functional polyester is all aliphatic.

In aspect 23 of this invention, there is provided a curable composition comprising any one of aspects 1-22 wherein Component (II) comprises an aliphatic, cycloaliphatic, or aromatic, di-, or poly-aldehyde or mixtures thereof.

In aspect 24 of this invention, there are provided compositions of any one of aspects 1-23 wherein at least one aldehyde useful in the invention can be selected from at least one of 1,3-cyclohexanedicarboxaldehyde (1,3-CHDAL); 1,4-cyclohexanedicarboxaldehyde (1,4-CHDAL); mixtures of 1,3- and 1,4-CHDAL, such as Paraloid Edge XL-195 available from The Dow Chemical Company, Midland, Mich., US; 2,6-norbornanedicarboxaldehyde; 2,5-norbornanedicarboxaldehyde; cyclododecane-1,4,8-tricarbaldehyde; 3-(4-formylcyclohexyl)propanal; tricyclodecane dialdehyde (TCDDAL); o-phthalaldehyde; terephthalaldehyde (TPAL); isophthalaldehyde; cyclopentane-1,3-dicarbaldehyde; cyclopenta-3,5-diene-1,3-dicarbaldehyde; glutaraldehyde; 5-methylfurfural; furfural; or 5-(hydroxymethyl) furan-2-carbaldehyde; benzenedipropanal; or any isomers thereof; or mixtures thereof.

In aspect 25 of this invention, there is provided a curable composition comprising any one of aspects 1-24, wherein said Component (I) is an acetoacetate functional polyester, Component (II) is selected from 1,3-cyclohexanedicarboxaldehyde (1,3-CHDAL), 1,4-cyclohexanedicarboxaldehyde (1,4-CHDAL), mixtures of 1,3- and 1,4-CHDAL, tricyclodecane dialdehyde, or any isomers thereof or any combinations thereof.

In aspect 26 of this invention, there is provided a curable composition comprising any one of aspects 1-25 wherein the equivalent ratio of the acetoacetate (AcAc) functional groups of Component (I) to the aldehyde functional groups in the composition is from about 4 to about 0.5; or from about 3 to about 0.5; or from about 3 to about 0.25; or from about 2 to about 0.25; or from about 2 to about 0.5; or from about 1.5 to about 0.5; or from about 1.3 to about 0.7; or from about 1.2 to about 0.8; or from about 1.1 to about 0.9; or from about 1.05 to about 0.95; or from about 2 to about 1; or from about 2 to about 1.05; or from about 1 to about 0.5; or from about 1 to about 0.1; or from about 1 to about 0.25.

In aspect 27 of this invention, there is provided a curable composition of any one of aspects 1-26 wherein the equivalent ratio of the acetoacetate (AcAc) functional groups of Component (I) to the aldehyde functional groups in the composition is from about 1.2 to about 0.8.

In aspect 28 of this invention, there is provided a curable composition of any one of aspects 1-27 comprising an adduct having two or more 3-ketoester functional groups selected from 2-methyl-1,3-propanediol diacetoacetate, neopentyl glycol diacetoacetate, 2,2,4,4-tetramethylcyclobutane-1,3-diacetoacetate, and trimethylolpropane triacetoacetate.

In aspect 29 this invention, there is provided a composition of any one of aspects 1-28 comprising at least one solvent.

In aspect 30 of this invention, there is provided a composition of any one of aspects 1-29, wherein the composition is solventless or solvent free.

In aspect 31 of this invention, there is provided the composition of any of aspects 1-22 wherein the composition is substantially free of solvent or comprises essentially no solvent.

In aspect 32 of this invention, there is provided the composition of aspect 29 wherein the solvent borne composition comprises organic solvents.

In aspect 33 of this invention, there is provided a composition of aspect 32 comprising one or more organic solvents selected from the group comprising ethyl acetate, butyl acetate, xylene, methyl amyl ketone, methyl ethyl ketone, and toluene.

In aspect 34 of this invention, there is provided the composition of any of aspects 29 or 32-33 which does not contain solvents or residues of solvents such as ethylene glycol and/or ether-containing compounds, for example, dimethyl ether, ethylene glycol diethyl ether, diethylene glycol dimethyl ether, diethylene glycol diethyl ether.

In aspect 35 of this invention, there is provided the composition of any of aspects 1-34 wherein the composition can be water-free, and/or moisture-free, and/or can comprise substantially no water, and/or can contain essentially no water, or can contain one of the following weight percentages of water: 0 to 20 weight %, 0 to 15 weight %, 0 to 10 weight %, or 0 to 5 weight %, or 0 to 4 weight %, or 0 to 3 weight %, or 0 to 2 weight %, or 0 to 1 weight %, or contains 0.01 to 20 weight %, 0.01 to 15 weight %, 0.01 to 10 weight %, or 0.01 to 5 weight %, or 0.01 to 4 weight %, or 0.01 to 3 weight %, or 0.01 to 2 weight %, or 0.01 to 1 weight %, based on the total weight of the composition.

In aspect 36 of this invention, there is provided the composition of any of aspects 1-35 wherein the composition is not a water-borne or a water-dispersible composition.

In aspect 37 of this invention, there is provided the composition of any of aspects 1-36 wherein the composition does not contain: a polyvinyl alcohol, or a polyvinyl polymer, or residues of unsaturated vinyl moieties.

In aspect 38 of this invention, there is provided the composition of any of aspects 1-37 wherein the composition does not contain neutralizing agents.

In aspect 39 of this invention, there is provided the composition of any of aspects 1-38 wherein diol component (a)(i) of Component (I) contains only oxygen, carbon, and hydrogen.

In aspect 40 of this invention, there is provided a composition of any of aspects 39 wherein diol component (a)(i) does not have any carbonyl groups (—CO—).

In aspect 41 of this invention, there is provided a composition of any of aspects 1-40 which upon curing releases essentially no volatile compounds; or no volatile organic compounds; or no VOCs; or less than 5 weight %, or less than 4 weight %, or less than 3 weight %, or less than 2 weight %, or less than 1 weight % VOCs based on the total weight of the composition.

In aspect 42 of this invention, there is provided a composition of any of aspects 1-41 wherein monoaldehydes are excluded from the scope of this invention.

In aspect 43 of this invention, there is provided a composition of any of aspects 4-42 wherein diol component (a)(i) of Component (I) does not contain ether groups.

In aspect 44 of this invention, there is provided a composition of any of aspects 1-43 which is not a water-dispersible polyester microgel composition.

In aspect 45 of this invention, there is provided a curable composition of any one of aspects 1-44 which is applied to a substrate to form an adhesive film.

In aspect 46 of this invention, there is provided a curable adhesive composition of aspect 45 wherein at least one substrate can be selected from metals such as aluminum, steel or galvanized sheeting; glass; urethane elastomers; primed (painted) substrates; wood; paper; polymer films such as polyethylene, polypropylene, and polyethylene terephthalate (PET).

In aspect 47 of the invention, there is provided a curable adhesive composition of any one of aspects 1-44 which can be applied to a first substrate or, optionally, can be applied to two or more substrates, wherein each substrate can be independently selected from the group consisting of a wood material, a metallic material, a plastic material, an elastomeric material, a composite material, a paper material, a fabric material, a glass material, a foamed material, a metal, a mesh material, a leather material, a synthetic leather material, a vinyl material, poly(acrylonitrile butadiene styrene) (ABS), polypropylene (PP), glass filled PP, talc filled PP, impact-modified PP, polycarbonate (PC), PC-ABS, urethane elastomers, thermoplastic polyolefin (TPO) compounds, pigmented TPO compounds, filled TPO compounds, rubber-modified TPO compounds, a primed (painted) material.

In aspect 48 of the invention, there is provided a curable adhesive composition of any one of aspects 1-44 which can be applied to a first substrate or, optionally, can be applied to two or more substrates, wherein each substrate can be independently, wherein the first substrate and the second substrate can each be independently selected from the group consisting of poly(acrylonitrile butadiene styrene) (ABS); polycarbonate (PC); PC-ABS blends; thermoplastic polyolefins such as polypropylene (PP); textiles, e.g., fabric materials, mesh, wovens, and/or nonwovens; foam materials; leather materials; vinyl materials; and/or others that would be apparent to one of ordinary skill in the art. These materials can be used with or without fillers such as talc, glass, etc. as described herein.

In aspect 49 of the invention, there is provided a curable adhesive composition of any one of aspects 1-44 wherein at least one adhesive composition of the invention can be applied to a first substrate and, optionally, can be applied to a second substrate and can each be independently selected from a polyester composite, a glass composite, or a wood-plastic composite.

In aspect 50 of the invention, there is provided a curable adhesive composition of any one of aspects 1-44 wherein at least one composition of the invention can be applied to a first substrate or, optionally, can be applied to two or more substrates, wherein each substrate can be independently selected from the group consisting of cast polypropylene, metallized polypropylene, foil laminated polypropylene, polyethylene terephthalate (PET), metallized PET, foil laminated PET, oriented PET, biaxially oriented PET, extruded PET, low density polyethylene (LDPE), oriented polypropylene, biaxially oriented polypropylene (BOPP), nylon, ethylene vinyl alcohol, and extruded films.

Unpredictably, the compositions of this invention can have one or more desirable properties including but not limited to: isocyanate free, curability, hydrolytic stability, thermal stability, solvent resistance, chemical resistance, weatherability, and reduced volatile compounds and/or volatile organic compounds (VOC).

DETAILED DESCRIPTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

It is believed that certain adhesives of the invention have one or more of the following desirable properties: can have one or more of the following desirable properties: isocyanate free, adequate cure time, e.g., curable at a wide range of temperatures including low and high temperatures, hydrolytic stability, thermal stability, weatherability, solvent resistance, chemical resistance, and reduced (volatile organic compounds) VOC.

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifications and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified.

Polyesters having moieties containing activated methylene or methine groups, such as those of beta-ketoesters, are curable with compounds having aldehyde functionality at low temperatures to form crosslinked networks. Formulations based on such polyesters and aldehyde compounds are especially suitable for low-temperature curing adhesive applications without the use of isocyanates.

In one embodiment of the invention, there is provided a curable composition comprising:

I. Component (I), comprising at least one amorphous or semi-crystalline polyester or at least one polyether having at least one or at least two functional groups selected from the group consisting of β-ketoester and malonate functional groups, II. Component (II), comprising at least one or at least two aldehyde functional groups or isomers thereof, and III. Component (III), comprising at least one basic catalyst, salts thereof, or combinations thereof.

In one embodiment of the invention, there is provided a curable adhesive composition comprising:

I. Component (I) comprising at least one amorphous or semi-crystalline polyester or at least one polyether having at least one or at least two functional groups selected from the group consisting of β-ketoester and malonate functional groups, II. Component (II) comprising at least one or at least two aldehyde functional groups or isomers thereof, and III. Component (III) comprising at least one basic catalyst, salts thereof, or combinations thereof.

In one embodiment of the invention, there is provided a curable composition comprising:

I. Component (I) comprising at least one amorphous or semi-crystalline polyester or at least one polyether having at least one or at least two functional groups selected from the group consisting of β-ketoester and malonate functional groups, II. Component (II) comprising at least one or at least two aldehyde functional groups or isomers thereof, and III. Component (III) comprising at least one tertiary amine, salts thereof, or combinations thereof.

In one embodiment of the invention, there is provided a curable adhesive composition comprising:

I. Component (I) comprising at least one amorphous or semi-crystalline polyester or at least one polyether or combinations thereof having at least two functional groups selected from the group consisting of β-ketoester and malonate functional groups, II. Component (II) comprising at least two aldehyde functional groups or isomers thereof, and III. Component (III) comprising at least one tertiary amine, salts thereof, or combinations thereof.

The polyester of Component (I) contains two or more beta-ketoester groups, represented by Formula 2, wherein Z is a polyester residue, n represents the average number of beta-ketoester groups per polymer chain and is an average of at least 2. In one embodiment, the beta-ketoester group is acetoacetate (AcAc), and the polyester is an acetoacetate-functional polyester.

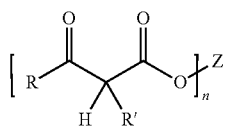

2

In one embodiment of the invention, there is provided a curable adhesive composition wherein the polyester of Component (I) is an acetoacetate functional polyester comprising the residues of
a. a hydroxyl component comprising:
   i. a diol in an amount ranging from 50 to 100 mole %, based on the total moles of (i) and (ii) equaling 100 mole %; and
   ii. a polyol in an amount ranging from 0 to 50 mole %, based on the total moles of (i) and (ii) equaling 100 mole %;
b. a carboxyl component comprising a polycarboxylic acid compound, a derivative of polycarboxylic acid compound, or a combination thereof; and
c. an alkyl acetoacetate, a diketene, or a combination thereof in an amount ranging from about 5 to about 50 weight %, based on the total weight of (a), (b), and (c).

The beta-ketoester groups are represented by Formula 1, wherein R is a branched or straight chain, saturated or unsaturated alkyl, alicyclic, or aromatic group; R' is a hydrogen or a branched or straight chain, saturated or unsaturated alkyl, alicyclic, or aromatic group.

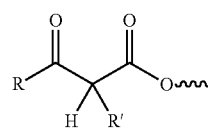

1

The equivalent ratio of the β-ketoacetate functional groups in the resin(s) of Component (I) to the aldehyde functional groups in the composition is defined as the ratio of the equivalents of β-ketoacetate functional groups or acetoacetate (AcAc) functional groups in the polyester to the equivalents of aldehyde functional groups in the composition. For example, the equivalents of the AcAc functional group in a sample of 100 g AcAc polyester with AcAc number of 120 mgKOH/g can be calculated by the formula: equivalents of AcAc polyester=100×120/56100=0.21; whereas the equivalents of the aldehyde functional group in a sample of 0.10 moles of a dialdehyde is equal to 0.10× 2=0.20. Thus, the equivalent ratio is equal to 0.21/0.20=1.05.

In one embodiment, the equivalent ratio of the acetoacetate functional group in the polyester to the aldehyde functional group in Component (II) (i.e. eq. of acetoacetate/eq. of aldehyde) can be from about 4 to about 0.25; or from about 4 to about 0.5; or from about 3 to about 0.5; or from about 3 to about 0.25; or from about 2 to about 0.25; or from about 2 to about 0.5; or from about 1.5 to about 0.5; or from about 1.3 to about 0.7; or from about 1.2 to about 0.8; or from about 1.1 to about 0.9; or from about 1.05 to about 0.95; or from about 2 to about 1; or from about 2 to about 1.05; or from about 1 to about 0.5; or from about 1 to about 0.1; or from about 1 to about 0.25.

In one embodiment, the equivalent ratio of the acetoacetate functional group in the polyester to the aldehyde functional group in Component (II) (i.e. eq. of acetoacetate/eq. of aldehyde) can be from about 2 to about 0.25; or from about 2 to about 0.5; or from about 1.5 to about 0.5; or from about 1.3 to about 0.7; or from about 1.2 to about 0.8; or from about 1.1 to about 0.9; or from about 1.05 to about 0.95.

The acetoacetate-functional polyester may be prepared by reacting a polyester resin containing hydroxyl groups, for example, a polyester having a hydroxyl number of at least 5, desirably about 30 to 200, with diketene or a compound having the beta-ketoacetate moiety such as t-butylacetoacetate (tBAA). Various methods for the preparation of acetoacetylated polyester coating resins have been described by Witzeman et al. in the Journal of Coatings Technology, Vol. 62, No. 789, pp. 101-112 (1990). Suitable amounts of each in a reaction mixture include from about 50 to about 95, 60 to 90, 65 to 85, or 70 to 80 weight. % of the polyester resin and from about 5 to about 50, 10 to 40, 15 to 35, or 20 to 30 weight. % of the compound having a beta-ketoacetate moiety or a diketene can be reacted together, wherein the weight percents are based on the total weight of the polyester resin and the compound having the beta-ketoacetate moiety.

In one embodiment, the curing agent (II) or an adduct having two or more aldehyde functional groups. Aldehydes useful in the invention can be selected from at least one of 1,3-cyclohexanedicarboxaldehyde (1,3-CHDAL); 1,4-cyclohexanedicarboxaldehyde (1,4-CHDAL); mixtures of 1,3- and 1,4-CHDAL, such as Paraloid Edge XL-195 available from The Dow Chemical Company, Midland, Mich., US; 2,6-norbornanedicarboxaldehyde; 2,5-norbornanedicarboxaldehyde; cyclododecane-1,4,8-tricarbaldehyde; 3-(4-formylcyclohexyl)propanal; tricyclodecane dialdehyde (TCD-DAL); o-phthalaldehyde; terephthalaldehyde (TPAL); isophthalaldehyde; cyclopentane-1,3-dicarbaldehyde; cyclopenta-3,5-diene-1,3-dicarbaldehyde; glutaraldehyde; methylfurfural; furfural; or 5-(hydroxymethyl)furan-2-carbaldehyde; benzenedipropanal; or any isomers thereof; or mixtures thereof.

In one embodiment of the invention, the aldehydes useful in the invention can be selected from at least one of 1,3-cyclohexanedicarboxaldehyde (1,3-CHDAL); 1,4-cyclohexanedicarboxaldehyde (1,4-CHDAL); mixtures of 1,3- and 1,4-CHDAL, such as Paraloid Edge XL-195 available from The Dow Chemical Company; 2,6-norbornanedicarboxaldehyde; terephthalaldehyde, isophthalaldehyde, orthophthalaldehyde, cyclopenta-3,5-diene-1,3-dicarbaldehyde and tricyclodecane dialdehyde, or any isomers thereof or any combinations thereof.

In one embodiment of the invention, the aldehyde useful in the invention can be selected from at least one of mixtures of 1,3- and 1,4-CHDAL, terephthalaldehyde, orthophthaladehyde, and tricyclodecane dialdehyde, or any isomers thereof or any combinations thereof.

In another embodiment, the acetoacetate functional polyester comprises the reaction product (or residues) of (a) from about 50 to about 95 weight percent of a hydroxyl functional polyester and (b) from about 5 to about 50 weight percent of an alkyl acetoacetate or diketene, wherein the weight percents are based on the total weight of (a) and (b) equaling 100 weight %. The weight % of (a) may be 50 to about 95, 60 to 90, 65 to 85, or 70 to 80 and the weight % (b) may be 5 to about 50, 10 to 40, 15 to 35, or 20 to 30 based on the total weight of (a) (the polyester resin) and (b) (the compound having the beta-ketoacetate moiety) equaling 100 weight %.

The hydroxyl number of the polyester resin used to make the curable polyester resin can be within a range of from greater than 0 to 300 mg KOH/g. In one embodiment, suitable ranges of hydroxyl number of the hydroxyl functional resin used to make Component (I) or compositions of the invention can be at least 5, or at least 30, or at least 50, or at least 80, or from 30 to 300, or from 30 to 200, or from 50 to 150 mg KOH/g.

In one embodiment, the composition of the invention or the polyester resin of the invention has an acid number of 0 to 15 or less than 15 or less than 10 mg KOH/g with and/or without neutralizing agents.

In one embodiment, acid number(s) of the compositions of the invention or of the polyester resin of the invention can be from 0 to about 14, or from 0 to about 13, or from 0 to about 12, or from 0 to about 11, or from 0 to about 10, or from 0 to about 9, or from 0 to about 8, or from 0 to about 7, or from 0 to about 6, or from 0 to 5 or from 0 to about 4, or from 0 to about 3, or from 0 to about 2, or from 0 to about 1, or from 0.01 to about 15, or from 0.01 to about 14, or from 0.01 to about 13, or from 0.01 to about 12, or from 0.01 to about 11, or from 0.01 to about 10, or from 0.01 to about 9, or from 0.01 to about 8, or from 0.01 to about 7, or from 0.01 to about 6, or from 0.01 to 5 or from 0.01 to about 4, or from 0.01 to about 3, or from 0.01 to about 2, or from 0.01 to about 1, or from 0.50 to about 15, or from 0.50 to about 14, or from 0.50 to about 13, or from 0.50 to about 12, or from 0.50 to about 11, or from 0.50 to about 10, or from 0.50 to about 9, or from 0.50 to about 8, or from 0.50 to about 7, or from 0.50 to about 6, or from 0.50 to 5 or from 0.50 to about 4, or from 0.50 to about 3, or from 0.50 to about 2, or from 0.50 to about 1.5 mg KOH/g, with or without addition of neutralizing agents.

The acid number as referred to herein was measured by using a procedure based on ASTM D7253-16 entitled "Standard Test Method for Polyurethane Raw Materials: Determination of Acidity as Acid Number for Polyether Polyols," and hydroxyl number was measured using a procedure based on ASTM E222-17 entitled "Standard Test Methods for Hydroxyl Groups Using Acetic Anhydride."

In one embodiment of this invention, the composition can have any one of the acid numbers in the previous paragraph, where neutralizing agents are not added to the composition after the polymerization reaction. Neutralizing agents can any neutralizing agent known in the art. In the embodiment of the invention where neutralizing agents are excluded from the scope of this invention, particularly where added after polymerization, neutralizing agents can include but are not limited to primary amines, secondary amines, tertiary amines, and ammonia as well as any other neutralizing agent known in the art, for example, for water dispersible microgel compositions.

The glass transition temperature (Tg) of the acetoacetate-functional polyester of the present invention may be from −40° C. to 150° C., or from −40° C. to 130° C., or from −40° C. to 100° C., or from −40° C. to 80° C., or from −30° C. to 150° C., or from −30° C. to 130° C., or from −30° C. to 100° C., or from −30° C. to 800, or from −30° C. to 70° C., or −20° to 150° C., or from −20° to 130°, or from −20° C. to 100° C., or from −20° C. to 80° C., or from −20° C. to 70° C., or from −20° C. to 60° C. For solventless adhesives, the Tg can be from about −65° to about −50° C.; for solvent-borne adhesives, Tg can be from −45° to −10° C. For hot melt adhesives, Tg can be from 30° C. to 130° C.

In one embodiment of the invention, there are provided compositions wherein Component (I) can have a number average molecular weight (Mn) from 500 to 100,000; or from 1,500 to 50,000; or less than 30,000; or from 1,000 to 20,000; or from 1000 to 15,000; or from 1000 to 10,000; or from 1000 to 9,000; or from 1000 to 8,000; or from 1000 to 7,000; or from 1000 to 6,000; or from 1000 to 5,000; or from 1000 to 4,000; or from 1200 to 3500; or from 1500-4000; or from 1500 to 3500; or from 1500 to 3000; or from 1500 to 2500; or from 1400 to 3000; or from 1400 to 2500; or from 500-6000 g/mol.

In one embodiment of the invention, there are provided compositions wherein Component (I) can have a number average molecular weight (Mn) from 1000-6000 g/mol; or 1000-5000 g/mol; or 1500-4000 g/mol; or 1400-3000 g/mol; or 1400-2500 g/mol; or 1500 to 3500 g/mol; or 1500 to 3000 g/mol; or 1500 to 2500 g/mol; or 500-6000 g/mol; or 1000-6000 g/mol. The polyester can be linear or branched. The polyester can be amorphous or semi-crystalline. The Mn is measured by gel permeation chromatography (GPC) using polystyrene equivalent molecular weight.

The weight average molecular weight (Mw) of the acetoacetate functional polyester of the present invention may be from 1,000 to 100,000; from 1,500 to 50,000; from 2,000 to 10,000; or from 2,500 to 5,000 g/mole. The polyester may be linear or branched. The Mw is measured by gel permeation chromatography (GPC) using polystyrene equivalent molecular weight.

Brookfield viscosity can be measured herein using a Brookfield viscometer as described in ASTM D3236 "Apparent Viscosity of Hot Melt Adhesives and Coating Materials."

In one embodiment of the invention, there are provided compositions wherein the Brookfield viscosity (or the complex viscosity) of Component (I) or any of the compositions of the invention is less than 700,000 centipoise, or less than 300,000 centipoise, or from 500 to 300,000 centipoise, or less than 100,000 centipoise, or less than 80,000 centipoise, or less than 30,000 centipoise, or less than 20,000 centipoise, or less than 10,000 centipoise, or less than 5,000 centipoise, or from 500 to 30,000 centipoise, or from 4500 centipoise or less, or from 2500 centipoise or less, or from 2000 centipoise or less, or 1000 centipoise or less, at application temperature, or at room temperature, or at 50° C. or less, or at 45° C. or less, or at 40° or less.

In one embodiment of the invention, there are provided compositions wherein the Brookfield viscosity (or the complex viscosity) of Component (I) or the curable compositions of the invention is from 500 cP or less, or 100 cP or less, or 50 cP or less, or from 1 to 100 cP, or from 1 to 50 cP, or from 10 to 50 cP, at application temperature, or at room temperature, or at 50° C. or less, or at 45° C. or less, or at 40° C. or less.

In one embodiment of the invention, there is provided a curable composition, e.g., solventless compositions, wherein the Brookfield viscosity (or the complex viscosity) of Component (I) or any of the compositions of the invention is from 5 to 5,000 cP, or 5000 cP or less, or 4500 cP or less, or 2500 cP or less, or 2000 cP or less, or 1500 cP or less, or 1000 cP or less, at application temperature, or at room temperature, or at 50° C. or less, or at 45° C. or less, or at 40° C. or less.

The hydroxyl functional polyester that is used to prepare acetoacetate polyester is typically synthesized by reacting a hydroxyl compound, for example, a diol or triol, with a carboxyl compound, for example, a dicarboxylic acid. Examples of hydroxyl compounds include diols such as 2,2,4,4-tetraalkylcyclobutane-1,3-diol (TACD), 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, hydrogenated bisphenol A, ethylene glycol, propylene glycol, diethylene glycol, dipropylene glycol, triethylene glycol, tetraethylene glycol, and polyethylene glycol, and polyols such as 1,1,1-trimethylol propane, 1,1,1-trimethylolethane, glycerin, pentaerythritol, erythritol, threitol, dipentaerythritol, sorbitol, and the like.

In one embodiment, examples of hydroxyl compounds include diols such as 2,2-dimethyl-1,3-propanediol (neopentyl glycol), 2-methyl-1,3-propanediol (MPD), tricyclodecanedimethanol, 2-butyl-2-ethyl-1,3-propanediol, 1,4-butanediol, 1,6-hexanediol (HD), 1,2-cyclohexanedimethanol, 1,3-cyclohexanedimethanol, 1,4-cyclohexanedimethanol (CHDM), 2,2,4-trimethyl-1,3-pentanediol, hydroxypivalyl hydroxypivalate, 2,2,4,4-tetramethylcyclobutane-1,3-diol (TMCD), ethylene glycol, diethylene glycol, triethylene glycol, polyethylene glycol (PEG), or combinations thereof.

In one embodiment of the invention, the diol can be 2,2,4,4-tetraalkylcyclobutane-1,3-diol (TACD). Examples of TACD include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, and 2,2,4,4-tetra-n-butylcyclobutane-1,3-diol. In one embodiment, the TACD can be TMCD.

In one embodiment of the invention, there are provided compositions wherein the polyesters can comprise residues of at least one diol component selected from the group consisting of neopentyl glycol, 2-methyl-1,3-propanediol, 1,6-hexanediol, 1,4-cyclohexanedimethanol, 2,2,4,4-tetramethylcyclobutane-1,3-diol, or combinations thereof.

In one embodiment of the invention, there are provided compositions wherein the polyesters can comprise 2-methyl-1,3-propanediol residues.

In one embodiment of the invention, there are provided compositions comprising residues of at least one polyol component selected from 1,1,1-trimethylolpropane, pentaerythritol or combinations thereof.

In one embodiment of the invention, there are provided compositions wherein the polyol component comprises from 0.01 to 50 mole %; or from 0.01 to 45 mole %; or from 5 to 50 mole %; or from 10 to 50 mole %; or from 5 to 40 mole %; or from 10 to 40 mole %; or from 15 to 40 mole %; or from 5 to 35 mole %; or from 10 to 35 mole %; or from 15 to 35 mole %; or from 5 to 30 mole %; or from 10 to 30 mole %; or from 15 to 30 mole % of polyol residues based on the total mole percentages of the diol component and the polyol component equaling 100 mole %.

The carboxyl compound can be a polycarboxylic acid compound, a derivative of polycarboxylic acid compound, or a combination thereof. Suitable polycarboxylic acid compounds can include compounds having at least two carboxylic acid groups. In one embodiment, the polycarboxylic acid compound comprises a dicarboxylic acid compound having two carboxylic acid groups, derivatives thereof, or combinations thereof, capable of forming an ester linkage with a polyhydroxyl component. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride. In another embodiment, the polycarboxylic acid compound comprises a tricarboxylic acid or anhydride, for example, trimellitic acid or trimellitic anhydride.

Examples of dicarboxylic acids that can be used include but are not limited to aliphatic dicarboxylic acids, alicyclic dicarboxylic acids, aromatic dicarboxylic acids, derivatives of each, or mixtures of two or more of these acids. Thus, suitable dicarboxylic acids include, but are not limited to, isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, tetrahydrophthalic anhydride, tetrachlorophthalic anhydride, dodecanedioic acid, sebacic acid, azelaic acid, maleic acid or anhydride, fumaric acid, succinic anhydride, succinic acid, adipic acid, 2,6-naphthalenedicarboxylic acid, glutaric acid, itaconic acid, tetrahydrophthalic anhydride, tetrahydrophthalic acid, hexahydrophthalic acid or anhydride, and their derivatives, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof.

In one embodiment of the invention, there are provided compositions wherein the polyesters can comprise at least one carboxyl component selected from the group consisting of adipic acid, isophthalic acid (or dimethyl isophthalate), terephthalic acid, dimethyl terephthalate, 1,4-cyclohexanedicarboxylic acid, 1,3-cyclohexanedicarboxylic acid, tetrahydrophthalic anhydride, tetrahydrophthalic acid, hexahydrophthalic acid, hexahydrophthalic anhydride, maleic anhydride, succinic anhydride, phthalic acid, and phthalic anhydride, or mixtures thereof.

In one embodiment of the invention, there are provided compositions wherein the polyesters can comprise at least one carboxyl component selected from the group consisting of adipic acid and isophthalic acid, or combinations thereof.

In one embodiment of the invention, there are provided compositions wherein the polyesters can comprise at least one carboxylic acid component further comprising from 0 mole % to 100 mole % adipic acid and from 0 mole % to 100 mole % isophthalic acid; or from 50 mole % to 100 mole % adipic acid and from 0 mole % to 50 mole % isophthalic acid; based on the total mole % of the carboxylic acid component equaling 100 mole %.

In one embodiment of the invention, there are provided compositions wherein the polyesters can comprise (a) a dicarboxylic acid component comprising 50 to 100 mole % adipic acid, 0 to 50 mole % isophthalic acid; and (b) at least one polyol comprising residues of 5 to 40, or 10 to 40, or 10 to 30 mole % of 1,1,1-trimethylolpropane, pentaerythritol or combinations thereof, (c) the diol component comprises residues of 0 to 90 mole % 2-methyl-1,3-propanediol, and 0 to 50 mole % neopentyl glycol, (d) optionally, 1,6-hexanediol, and (e) optionally, 1,4-cyclohexanedimethanol; based on the total mole % of the dicarboxylic acid component equaling 100 mole % and the total mole % of the polyol and diol components equaling 100 mole %.

In one embodiment of the invention, there are provided compositions wherein the polyesters can comprise (a) a dicarboxylic acid component comprising 50 to 100 mole % adipic acid and 0 to 50 mole % isophthalic acid; and (b) at least one polyol comprising residues of 5 to 40 mole %, 10 to 40 mole %, or 10 to 30 mole % 1,1,1-trimethylolpropane, pentaerythritol or combinations thereof, (c) the diol component comprises residues of from 0 to 90 mole % 2-methyl-1,3-propanediol, and from 0 to 50 mole % neopentyl glycol, (d) from 5 to 85; or from 5 to 40; or from 15 to 85; or from 35 to 85; or from 55 to 85 mole % 1,6-hexanediol, and/or (e) from 15 to 85; or from 20 to 80; or from 35 to 80; or from 40 to 75; or from 60 to 85; or from 65 to 80; or from 60 to 75 mole % of 1,4-cyclohexanedimethanol.

In one embodiment of the invention, there are provided compositions wherein either or both of Components (I) and (II) comprise at least one aromatic group. For example, the diacid of the polyester can comprise either isophthalic acid or terephthalic acid and/or the aldehyde can be terephthalaldehyde.

In one embodiment, examples of said alkyl acetoacetate (c) can be selected from t-butyl acetoacetate, methyl acetoacetate, ethyl acetoacetate, n-propyl acetoacetate, isopropyl acetoacetate, n-butyl acetoacetate, isobutyl acetoacetate, t-amyl acetoacetate, diisopropyl carbinol acetoacetate, or mixtures thereof.

The malonate-functional polyester is a polyester having malonic acid or its ester, such as dimethyl malonate or diethyl malonate, as one of the diacid components. In one embodiment, the malonate-functional polyester is a hydroxyl functional polyester as described previously.

Thus, in one embodiment, the malonate-functional polyester comprises the residues of
a. a hydroxyl component comprising
  i. a diol in an amount ranging from 70 to 100 mole %, based on the total moles of (i) and (ii), and
  ii. a polyol in an amount ranging from 0 to 30 mole %, based on the total moles of (i) and (ii), and
b. malonic acid, its ester, or a combination thereof, and
c. optionally a carboxyl component, other than malonic acid or its ester, comprising a polycarboxylic acid compound, a derivative of polycarboxylic acid compound, or a combination thereof.

The hydroxyl component (a) and the carboxyl component (c) are the same as defined in the description of the hydroxyl functional polyester. In one embodiment, malonic acid (b) is in an amount of about 5 to 80 mole % based on the total carboxyl components equaling 100 mole %, (b) and (c), or 10 to 70, or 15 to 60, or 20 to 50, or 25 to 45, or 30 to 40 mole %.

In another embodiment, the malonate-functional polyester is further reacted with a β-ketoacetate compound or diketene to yield a polyester having both malonate and 1-ketoacetate functional groups.

The curable adhesive composition of the present invention further comprises a base catalyst (III) in an amount ranging from 0.1 to 10, 0.2 to 7, 0.3 to 6, or 0.5 to 5 weight %, based on the total weight of the first component (I) and the second component (II).

Examples of the base catalyst include amidine type, such as 1,8-diazabicyclo-[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7-triazabicyclo[4.4.0]dec-5-ene (MTBD), and 1,1,3,3-tetramethylguanidine (TMG), bicyclic unhindered tertiary amine type such as 1,4-diazabicyclo[2.2.2]octane (DABCO), tertiary amine type such as triethylamine and N,N-dimethylethanolamine, quaternary ammonium compounds such as ammonium hydroxide and tetrabutyl ammonium hydroxide, phosphine type such as triphenyl phosphine and tributyl phosphine, and inorganic bases such as sodium hydroxide and potassium hydroxide, and mixtures thereof. The amidine type, the bicyclic unhindered tertiary amine type, and the tertiary amine type are more desirable. In one embodiment, the amidine type is used, such as 1,8-diazabicyclo-[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7-triazabicyclo[4.4.0]dec-5-ene (MTBD), and 1,1,3,3-tetramethylguanidine (TMG).

In one embodiment of the invention, there are provided compositions comprising tertiary amines which can be selected from at least one of 1,8-diazabicyclo-[5.4.0]undec-7-ene, 1,5-diazabicyclo[4.3.0]non-5-ene, 1,5,7-triazabicyclo[4.4.0]dec-5-ene, 7-methyl-1,5,7-triazabicyclo[4.4.0]dec-5-ene, and 1,1,3,3-tetramethylguanidine, 1,4-diazabicyclo[2.2.2]octane, triethylamine and N,N-dimethylethanolamine, or combinations thereof. "Tertiary amines" as can be included within the scope of this invention comprises amines or compounds having tertiary amine functionality.

In order to extend the pot life of the curable adhesive composition of the invention, the base catalyst (III) may be temporarily blocked. For example, an alcohol such as methanol, ethanol, n-propanol, isopropanol may be added to the composition on storage to block the catalyst. When the composition is applied, the alcohol will evaporate and the catalyst de-blocked. A carboxylic acid, such as benzoic acid, acetic acid, formic acid, or cyanoacetic acid, can also be added to the composition to block the catalyst and subsequently deblock by heating. Such techniques for blocking and deblocking the amidine catalysts have been disclosed in Progress in Organic Coatings, 32 (1997), 137-142 by Arie Noomen. "Pot life" means period of time during which a multi-part adhesive composition can be used after mixing the components.

Moreover, methanol can be effective in blocking the basic catalyst such as DBU. Solvent-borne adhesives formulated with DBU in methanol (e.g. 25% by weight) have been found to remain fluid over time and have significantly less viscosity increase than those formulated with DBU in n-propanol or ethanol.

Thus, in a further embodiment, the curable adhesive composition of the present invention further comprises a catalyst-blocking agent. Examples of such blocking agents include alcohols, such as methanol, ethanol, isopropanol, n-propanol, and the like, and carboxylic acids such as benzoic acid, formic acid, acetic acid, and cyanoacetic acid. In one embodiment, methanol is used.

In yet another embodiment, the curable adhesive composition of the present invention further comprises one or more adducts having two or more β-ketoester functional groups such as, for example, 2-methyl-1,3-propanediol diacetoacetate, neopentyl glycol diacetoacetate, 2,2,4,4-tetramethylcyclobutane-1,3-diol diacetoacetate, and trimethylolpropane triacetoacetate, which are prepared from the corresponding diol or triol. The adducts function as reactive diluents to reduce the viscosity of the adhesive formulations and to reduce the solvent content. In solventless formulations, the pot like can be extended as well. The adducts can also increase the functionality of the β-ketoacetate functional groups available for curing and/or crosslinking.

In this invention, "curing" means to develop at least one strength property and/or increase in the average molecular weight (either Mn or Mw) of the composition(s) of the invention, for example, an adhesive composition or a coating composition, by chemical reaction. "Curing agent" means a substance or mixture of substances that reacts with resin during a curing reaction. "Curing temperature" means the temperature to which at least one composition(s) of the invention or an article of manufacture containing at least one composition(s) of the invention is subjected to cure the composition. "Curing time" means the period of time for curing of the composition(s) of the invention to occur, whether or not they cure at room temperature, and whether or not they are subjected to application of thermal energy; radiation, e.g., microwave, ultraviolet, or infrared radiation; ultrasonic waves; pressure; moisture; or other sources of activation; or any other variables. "Curable" means capable of curing.

The curable adhesive composition of the invention is capable of reacting at an ambient temperature in the presence of a base catalyst. In a so-called 2K system, it is required to mix the two components shortly before use to prevent the composition from premature curing and becoming useless. In the present invention, the mixing of the two components does not result in significant reactions in the absence of a catalyst. Thus, the polyester and the curing agent may be mixed and stored until the mixture is ready to be used. The base catalyst can then be added shortly before use.

In one embodiment of the invention, there are provided compositions comprising essentially no solvent or which is solventless (except for where solvents can be added, in some embodiments, to the final composition to adjust the viscosity). By the terms "solventless" or "comprising essentially no solvent", it is meant that solvent could be present in an amount of from 0 to 5 weight % or from 0 to 2 weight %, based on the total weight of the composition.

In one embodiment of the invention, there are provided compositions wherein Components (I)-(III) are mixed or reacted without the presence of solvent.

In one embodiment of the invention, there are provided compositions wherein Components (I)-(III) are mixed or reacted in the presence of solvent.

The curable composition of the invention may be essentially solvent free, solvent-less or solvent-based. In one embodiment, the solvent-based composition of the invention comprises an organic solvent. Suitable organic solvents include ethyl acetate, butyl acetate, xylene, ketones (for example, acetone, methyl amyl ketone and methyl ethyl ketone), 2-butoxyethanol, ethyl-3-ethoxypropionate, toluene, butanol, cyclopentanone, cyclohexanone, ethanol, and other volatile inert solvents typically used in adhesives. In one embodiment, the solvents useful in the invention are ethyl acetate, butyl acetate, xylene, methyl amyl ketone, methyl ethyl ketone, acetone, ethanol, and toluene.

In one embodiment of the invention, there are provided compositions which contains one or more organic solvents selected from the group comprising ethyl acetate, butyl acetate, xylene, methyl amyl ketone, methyl ethyl ketone, ethanol, acetone, methanol and toluene.

In one embodiment of the invention, there are provided compositions wherein at least one solvent can be selected from ethyl acetate, butyl acetate, ethanol and acetone, or combinations thereof.

In embodiment of the invention, there are provided compositions wherein at least one solvent can be selected from ethyl acetate, butyl acetate, or combinations thereof.

In one embodiment of the invention, there is provided compositions comprising at least one solvent which is not an ether or polyether and/or which does not contain ether groups. In one embodiment of this invention, the curable compositions of this invention do not contain solvents or residual amounts of solvents such as ethylene glycol and/or ether-containing compounds, for example, dimethyl ether, ethylene glycol diethyl ether, diethylene glycol dimethyl ether, or diethylene glycol diethyl ether.

In one embodiment of the invention, there are provided compositions wherein said organic solvents are used to reduce the viscosity of the adhesive composition.

In one embodiment of the invention, there are provided compositions wherein said adducts having two or more β-ketoester functional groups described herein are used as reactive diluents to reduce the viscosity of the curable compositions and/or to reduce the solvent content.

The amount of solvents (excluding water) can range from 0% to 75%, 5% to 75%, 10% to 75%, 15% to 75%, 20% to 75%, 25% to 75%, 30% to 75%, 35% to 75%, 40% to 70%, 0% to 70%, 5% to 70%, 10% to 70%, 15% to 70%, 20% to 70%, 25% to 70%, 30% to 70%, 35% to 70%, 40% to 70%, 0% to 65%, 5% to 65%, 10% to 65%, 15% to 65%, 20% to 65%, 25% to 65%, 30% to 65%, 35% to 65%, 40% to 65%, 0% to 60%, 5% to 60%, 10% to 60%, 15% to 60%, 20% to 60%, 25% to 60%, 30% to 60%, 35% to 60%, 40% to 60%, 0% to 55%, 5% to 55%, 10% to 55%, 15% to 55%, 20% to 55%, 25% to 55%, 30% to 55%, 35% to 55%, 40% to 55%, 0% to 50%, 5% to 50%, 10% to 50%, 15% to 50%, 20% to 50%, 25% to 50%, 30% to 50%, 35% to 50%, 40% to 50%, 0% to 45%, 5% to 45%, 10% to 45%, 15% to 45%, 20% to 45%, 25% to 45%, 0% to 40%, 5% to 40%, 10% to 40%, 15% to 40%, 20% to 40%, 25% to 40%, or 0% to 5% by weight based on the total weight of the composition equaling 100 weight %.

In one embodiment, the amount of solvents (excluding water) can range from 20 to 65%, or 20 to 55%, or 20 to 50%, or 25 to 45%, or 40 to 60%, or 25 to 55%, or 25 to 60%, by weight based on the total weight of the composition equaling 100 weight %. The percentage by weight of solids (based on the total weight of the composition equaling 100 weight %) is the remainder of the weight % of the composition that does not comprise solvent(s). Therefore, the percentage by weight of solids based on the total weight of the composition equaling 100 weight % would be, for example, 20% to 100%, 20% to 95%, 20% to 90%, 20% to 85%, 20% to 80%, 20% to 75%, 20% to 70%, 25% to 100%, 25% to 98%, 25% to 95%, 25% to 90%, 25% to 85%, 25% to 80%, 25% to 75%, 25% to 70%, 30% to 100%, 30% to 95%, 30% to 90%, 30% to 85%, 30% to 80%, 30% to 75%, 30% to 70%, 35% to 100%, 35% to 95%, 35% to 90%, 35% to 85%, 35% to 80%, 35% to 75%, 35% to 70%, 40% to 100%, 40% to 95%, 40% to 90%, 40% to 85%, 40% to 80%, 40% to 75%, 40% to 70%, 50% to 100%, 50% to 95%, 50% to 90%, 50% to 85%, 50% to 80%, 50% to 75%, 50% to 70%, 50% to 65%, 50% to 60%, 55% to 100%, 55% to 95%, 55% to 90%, 55% to 85%, 55% to 80%, 55% to 75%, 55% to 70%, 55% to 65%, 60% to 100%, 60% to 95%, 60% to 90%, 60% to 85%, 60% to 80%, 60% to 75%, 60% to 70%, 95% to 99.99%, or 98% to 99.99%.

The term "excluding water" means that water is not added as a solvent but moisture and/or water can be formed during the curing process.

In one embodiment of this invention, the curable composition of the invention can be water-free, and/or moisture-free, and/or can comprise substantially no water, and/or can contain essentially no water, or can contain one of the following percentages of water: 0 to 20 weight %, 0 to 19 weight %, 0 to 18 weight %, 0 to 17 weight %, 0 to 16 weight %, 0 to 15 weight %, 0 to 14 weight %, 0 to 13 weight %, 0 to 12 weight %, 0 to 11 weight %, 0 to 10 weight %, 0 to 9 weight %, 0 to 8 weight %, 0 to 7 weight %, 0 to 6 weight %, 0 to 5 weight %, 0 to 4 weight %, 0 to 3 weight %, 0 to 2 weight %, 0 to 1 weight %, 0.01 to 20 weight %, 0.01 to 19 weight %, 0.01 to 18 weight %, 0.01 to 17 weight %, 0.01 to 16 weight %, 0.01 to 15 weight %, 0.01 to 14 weight %, 0.01 to 13 weight %, 0.01 to 12 weight %, 0.01 to 11 weight %, 0.01 to 10 weight %, 0.01 to 9 weight %, 0.01 to 8 weight %, 0.01 to 7 weight %, 0.01 to 6 weight %, 0.01 to 5 weight %, 0.01 to 4 weight %, 0.01 to 3 weight %, 0.01 to 2 weight %, or 0.01 to 1 weight %, based on the total weight of the composition. The term "substantially water free" means that no more than 0.01 to 2 weight % water could be present prior to the curing reaction.

In one embodiment of the invention, there is provided composition(s) of the invention wherein the solids content is from 25 to 100, or from 25 to 98, or from 25 to 95, or from 35 to 80, or from 35 to 75, or from 40 to 60, or from 45 to 60, or from 40 to 65, or from 45 to 65, or from 50 to 80, or from 55 to 75% by weight solids.

In one embodiment of the invention, there is provided composition(s) of the invention wherein the solids content is from 25 to 80, or from 30 to 80, or from 35 to 80, or from 35 to 75, or from 30 to 65, or from 30 to 60, or from 40 to 60, or from 45 to 60, or from 40 to 65, or from 45 to 65, or from 50 to 80, or from 55 to 75% by weight solids.

In one embodiment of the invention, there is provided composition(s) of the invention wherein the solids content is from 25 to 100% by weight solids, 25 to 95% by weight solids, or 95% by weight solids or greater, or 100% by weight solids.

In one embodiment of the invention, there is provided composition(s) of the invention wherein the solids content of the composition is from 35 to 75% by weight solids.

In some cases, the composition(s) of the invention can be a liquid composition in water or solvent, applied to a surface and dried or permitted to dry, while, in other embodiments, the composition may be at or near 100 percent solids. In one embodiment of this invention, there are provided curable compositions which, upon curing, can release essentially no Volatile Components, e.g., Volatile Organic Components (VOCs), or has low Volatile Components, e.g., VOCs, released before, during, and/or after curing; or less than 5 weight %, less than 4 weight %, less than 3 weight %, less than 2 weight %, or less than 1 weight % VOCs; based on the total weight of the composition.

In one embodiment of this invention, there are provided curable compositions which, upon curing, can release essentially no gases or no gases.

In one embodiment of the invention, the compositions of the invention can further comprise at least one compound selected from waxes; paraffins; rosins; rosin ester resins; tackifier resins; polyester resins; polyol resins; or acrylics, the acrylics having a number average molecular weight of from about 2,000 to 15,000 and a Tg of from about 40° C. to 130° C.; or mixtures thereof.

In one embodiment of this invention, the composition of this invention is not a water-borne or a water-dispersible composition.

In one embodiment of this invention, the composition of this invention does not contain: a polyvinyl alcohol, or a polyvinyl polymer, or residues of unsaturated vinyl moieties.

In one embodiment of this invention, diol component (a)(i) of the composition contains only oxygen, carbon, and hydrogen.

In one embodiment of this invention, diol component (a)(i) does not have any carbonyl groups (—CO—).

In one embodiment of this invention, monoaldehydes are excluded from the scope of this invention.

In one embodiment of the invention, there are provided compositions comprising a fourth component, Component (IV), which is at least one additive comprising at least one adhesion promoter, at least one green strength enhancer, or combinations thereof, or wherein said at least one additive is both an adhesion promoter and a green strength enhancer.

In one embodiment, the compositions of the invention that contain Component (IV) demonstrate retention of cohesive strength as measured by the 180 peel test as described herein. In another embodiment, the compositions of the invention that contain Component (IV) in an amount up to 25 weight %, or up to 20 weight % or up to 15 weight %, demonstrate either no loss of cohesive strength or a loss of no more than 20%, or no more than 15%, or no more than 10%, or no more than 5%, of cohesive strength as measured by the 180 peel test measured as described herein.

In one embodiment of the invention, there are provided compositions wherein Component (IV) is present in an amount from about 1 phr to about 70 phr, or from about 1 phr to about 60 phr, or from about 1 phr to about 50 phr, or from about 1 phr to about 40 phr, or from about 1 phr to about 30 phr, or from about 1 phr to about 25 phr, or from about 4 phr to about 56 phr, or from about 5 phr to about 50 phr, or from about 5 phr to about 40 phr, or from about 5 phr to about 30 phr, or from about 5 phr to about 25 phr, or from about 10 phr to about 50 phr, or from about 10 phr to about 40 phr, or from about 10 phr to about 30 phr, or from about 10 phr to about 25 phr, or from about 10 phr to about 20 phr, based on the total weight of Component (I), the resin.

In one embodiment of the invention, there are provided compositions wherein Component (IV) is present from about 10 phr to about 25 phr, based on the total weight of Component (I), the resin.

In one embodiment of the invention, there are provided compositions wherein the green bond strength of the cured adhesive composition is increased by addition of Component (IV). Alternatively, the green bond strength of the composition which includes Component (IV) is greater than the green bond strength of the composition which does not include Component (IV). Component (III) levels can contribute to green bond strength.

"Green bond strength" or "green strength" is defined herein as the ability of a composition to hold two surfaces together when brought into contact and before the composition develops its ultimate bond properties when fully cured and as defined in ASTM 907. Good green strength is desirable, in some instances, because it can relate to a composition's resistance to deformation and fracture before curing. In addition, good green strength, in some instances, can indicate that a composition will withstand mechanical operations or other processing techniques.

Tackifying resins (tackifiers) can be added to the curable compositions of the invention to modify the adhesive or coating properties, including but not limited to the green strength, viscosity, wetting behavior, adhesion, particularly to low energy surfaces, and viscoelastic behavior of the finished adhesive or coating composition. The tackifier resin selected may vary depending on the exact curable composition and the balance of properties needed in an application, such as peel strength, shear strength, and tack. These properties are important to adhesive compositions and the best advantages are achieved where the overall balance of these properties, both initially and over time in different environmental conditions, have been optimized.

Tackifier resins that may be present in the adhesive compositions include, without limitation, cycloaliphatic hydrocarbon resins, C5 hydrocarbon resins, C5/C9 hydrocarbon resins, aliphatic-aromatic hydrocarbon resins, aromatically modified C5 resins (commercially available as Piccotac™ resins, Eastman Chemical Company, TN, US), C9 hydrocarbon resins, C9 hydrocarbon resins (commercially available as Picco™ resins, Eastman), pure monomer resins, e.g. copolymers of styrene with alpha-methyl styrene, vinyl toluene, para-methyl styrene, indene, and methyl indene (commercially available as Kristalex™ resins, Eastman), dicyclopentadiene (DCPD) resins, dicyclopentadiene based/containing resins, cyclopentadiene based/containing resins, terpene resins (commercially available as Sylvares™ resins, AZ Chem Holdings, LP, Jacksonville, Fla., US), terpene phenolic resins, terpene styrene resins, rosin acid resin, esters of rosin (commercially available as Permalyn™ resins, Eastman), esters of modified rosins, liquid resins of fully or partially hydrogenated rosins, fully or partially hydrogenated rosin esters (commercially available as Foral™ E and Foralyn™ resins, Eastman), fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated DCPD resins (commercially available as Escorez® 5000-series resin), fully or partially hydrogenated modified DCPD resins (commercially available as Escorez® 5600-series resin), both Escorez® resins available from ExxonMobil Chemical Company, TX, US), fully or partially hydrogenated modified dicyclopentadiene based/containing resins, aromatically modified C5 resins (commercially available as Piccotac™ resins, Eastman Chemical Company, TN, US), fully or partially hydrogenated aromatically modified C5 resins, fully or partially hydrogenated C9 resins (commercially available as Regalite™ resins, Eastman), fully or partially hydrogenated pure monomer resins (e.g., copolymers or styrene with alpha-methyl styrene, vinyl toluene, para-methyl styrene, indene, and methyl indene) (commercially available as Regalrez™ resins, Eastman), fully or partially hydrogenated C5/cycloaliphatic resins (commercially available as Eastotac™ resins, Eastman), fully or partially hydrogenated C5/cycloaliphatic/styrene/C9 resins, fully or partially hydrogenated cycloaliphatic resins, and/or combinations thereof.

In one embodiment of the invention, there are provided compositions wherein said Component (IV) can be selected from C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene based/containing resins, partially hydrogenated rosin esters, partially hydrogenated dicyclopentadiene based/containing resins, partially hydrogenated modified dicyclopentadiene based/containing resins, partially hydrogenated aromatically modified C5 resins, partially hydrogenated C9 resins, partially hydrogenated pure monomer resins, partially hydrogenated aromatic-modified cycloaliphatic resins, partially hydrogenated cycloaliphatic resins, and/or combinations thereof.

In one embodiment of the invention, there are provided compositions wherein said tackifiers can be selected from C5 hydrocarbon resins, C9 hydrocarbon resins, aliphatic-aromatic hydrocarbon resins, aromatic hydrocarbon resins, pure monomer hydrocarbon resins, aliphatic-aromatic hydrocarbon resins, fully or partially hydrogenated C9 resins, rosin ester resins, and/or combinations thereof.

The compositions in the invention can be useful as a "warm" melt adhesive for those applications where hot melt adhesives are currently employed and applied by techniques known to those skilled in the art. The melting point and/or ring and ball softening point (RBSP) of one or more tackifier resins in the curable composition can be selected to suit the intended end use for the curable composition, where RBSP is measured by ASTM D6493-11 "Standard Test Methods for Softening Point of Hydrocarbon Resins and Rosin Based Resins by Automated Ring-and-Ball Apparatus." In various embodiments, the tackifier resin has a RBSP from −10° C. to 160° C. In some embodiments, the tackifier resin has an acid number in the range of 0 to 170, 0 to 30, 0 to 25, or 0 to 11 mg KOH/g. In some embodiments, tackifier resins with zero or low acid numbers are preferred to reduce interference with the base catalyst. In some embodiments, tackifier resins can have moderate or high acid numbers, for example, where the amine is buffered.

In other embodiments, tackifier resins with RBSP above the expected application temperature and with acid numbers of about 5 to about 10, or of about 11 to about 22, or of about 145 to about 165 mg KOH/g, can be added in amounts up to an equimolar amount of base catalyst in order to act as a base scavenger at high temperatures and improve thermal stability of the cured composition as well as to provide improved adhesion. Non-limiting examples of tackifier resins that may be used include Poly-Pale™ (AN 155, RBSP 103° C.), Dymerex™ (AN 145, RBSP 144° C.), Foral™ AX-E (AN 165, RBSP 8° C.), Permalyn™ 6110 (AN 13, RBSP 103° C.), and Foralyn™ 90 (AN 8, RBSP 82° C.) (Eastman).

Any conventionally known wax which is suitable for use in formulating adhesives can be used in the practice of the invention. Suitable waxes can include, for example, microcrystalline wax, paraffin wax, waxes produced by Fischer-Tropsch processes, functionalized waxes (maleated, fumerated, silanated, or wax with functional groups etc.), polyolefin waxes, petroleum waxes, polypropylene waxes, polyethylene waxes, ethylene vinyl acetate waxes, and vegetable waxes.

Non-limiting examples of commercially available waxes that can be suitable for this invention include A-C™ 9 and A-C™ 810, available from Honeywell International Inc. Morristown, N.J., US; POLYWAX™ 400, 850, 1000, and 3000 from Baker Hughes Inc., Sugar Land, Tex., US; Licocene™ PE4201 from Clariant International LTD, Muttenz, Switzerland; Epolene™ N-15, Epolene™ C-10, Epolene™ C-17 and Epolene™ C-18 from Westlake Polymers, LLC, Houston, Tex., US; Sasolwax™ 3279 microcrystalline wax from Sasol Chemical Industries Limited, South Africa; and microcrystalline wax Be Square™ 195 (Baker Hughes).

In various embodiments, adhesives comprising the curable compositions of the inventions can comprise at least 1, 2, 5, 8, or 10 and/or not more than 40, 30, 25, 20, or 15 weight percent of at least one tackifier based on the total weight of the final composition equaling 100 weight %. Moreover, said adhesives can comprise in the range of 1 to 40, 5 to 30, 8 to 25, or 10 to 20 weight percent of at least one tackifier.

Furthermore, a functionalized wax may react with the curable composition, reducing the amount of material that may potentially migrate from the adhesive or coating. Suitable functionalized waxes include but are not limited to Honeywell A-C™ 596; Clariant Licocene™ MA6252 and Licocene™ MA6452; and Westlake Epolene™ E-43.

In one embodiment of this invention, there is provided a curable composition of the invention having initial green strength and cured bond strength wherein:
(a) Component (I) comprises at least two functional groups selected from the group consisting of β-ketoacetate and malonate functional groups;
(b) Component (II) comprises at least one curing agent having at least two aldehyde functional groups;
(c) The equivalent ratio of the acetoacetate (AcAc) functional group of Component (I) to the aldehyde functional group is from about 3 to 0.25, or from about 3 to 0.5, or from about 2.5 to 0.25, or from about 2.5 to 0.5, or from about 2.5 to 0.6, or from about 2 to 0.25, or from about 2 to 0.5, or from about 2 to 0.6, or from about 1.2 to 0.8;
(d) Component (III) is at least one amine having tertiary amine functionality, or combinations thereof;
(e) Component (IV) is at least one tackifier resin, wherein:
 a. the tackifier resin can be present in an amount from about 1 phr to about 70 phr, or from about 10 phr to about 60 phr, or from about 10 phr to about 25 phr, based on the total weight of Component (I), the resin; and,
 b. the tackifier resin can be selected from cycloaliphatic hydrocarbon resins, C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene resins, dicyclopentadiene based/containing resins, cyclopentadiene based/containing resins, rosin acid resins esters of rosin, esters of modified rosins, liquid resins of fully or partially hydrogenated rosins, fully or partially hydrogenated rosin esters, fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated dicyclopentadiene resins, fully or partially hydrogenated modified dicyclopentadiene based/containing resins, fully or partially hydrogenated aromatically modified C5 resins, fully or partially hydrogenated C9 resins, fully or partially hydrogenated pure monomer resins, fully or partially hydrogenated C5/cycloaliphatic resins, fully or partially hydrogenated C5/cycloaliphatic/styrene/C9 resins, fully or partially hydrogenated cycloaliphatic resins, and/or combinations thereof; and
 c. wherein the 180-degree peel strength and/or T-peel strength of the composition is greater than when a tackifier resin or other adhesion promoter is not present in the same composition.

In one embodiment of the invention, there are provided compositions comprising adhesion promoters and/or green strength enhancers, for example, tackifiers, wherein the composition is cured.

In one embodiment of the invention, there are provided compositions wherein the 180-degree peel adhesion and/or T-peel strength of the composition is greater than when a tackifier resin or other adhesion promoter is not present in the same composition.

In one embodiment of the invention, there are provided compositions wherein the 180-degree peel adhesion and/or T-peel strength of the composition is at least 100 percent greater than when tackifier or other adhesion promoter is not present in the same composition.

In one embodiment of the invention, there are provided compositions wherein the tackifier resin can be present in an amount up to about 65 parts per hundred acetoacetylated polyester and/or polyether [Component (I)]; and wherein the 180-degree peel adhesion of the composition is greater than when tackifier or other adhesion promoter is not present.

In one embodiment of the invention, there are provided compositions comprising blends of at least one acetoacetylated polyether resin and/or at least one acetoacetylated polyester resin(s) and optionally, other polymers.

A "solid" is defined herein as not a liquid or gas at room temperature and/or at application temperature and can include but is not limited to waxy and/or semi-crystalline materials.

In one embodiment of the invention, there are provided compositions wherein at least one additive to promote adhesion or green strength enhancement or both (Component (IV) is first combined with (a) Component (I), Component (II), or Component (III); or (b) Component (I) and Component (II); or (c) Component (II) and Component (III); or (d) Component (I) and Component (III) or (e) any order of combination of Components (I)-(IV) can be used.

In various embodiments, the curable adhesive compositions can be applied in the range of about 0.5 gsm to about 200 gsm (gsm=grams per square meter). In embodiments where the curable composition will be used to bond substrates to each other, the add-on rate used will be suitable for generating laminates or composites with the desired bond strength. The curable composition can be applied to one or both substrates before the substrates are brought into contact to form a composite, laminate or article. The article so formed may be optionally contacted with additional substrates, additional curable compositions, adhesives, and/or may be subjected to applied pressure and/or applied heat, in any order or combination without limitation.

In one embodiment of the invention, there is provided a process for preparing and curing a reactive adhesive comprising preparing a composition of the invention for a reactive adhesive and applying heat from an external source at a temperature above or at ambient temperature to said composition, whereby polymerization is initiated.

In one embodiment of the invention, there is provided a process for forming a laminate structure, comprising the following steps: (1) forming an adhesive composition by combining at least Components (I)-(III) of any of the compositions of the invention; and (2) applying the adhesive composition to a surface of a first substrate; thereby forming the laminate structure.

In one embodiment, an article of manufacture is provided comprising at least one substrate, e.g., flexible substrate, coated with at least one composition of the invention.

In one embodiment, an article of manufacture is provided comprising at least two substrates wherein between said substrates is at least one of the compositions of the invention which has cured.

In one embodiment of the invention, the article of manufacture of the invention can be a laminated structure.

In one embodiment of the invention, there is provided a process for preparing a laminate comprising applying at least one of Components (I)-(III) of any of the compositions of the invention on the surface of a first substrate, applying the remaining components of Components (I)-(III) on the surface of a second substrate, and then curing said combined components.

In one embodiment of the invention, there is provided the above process wherein at least one of the adhesive compositions of the invention is then cured, for example, at or near room temperature.

In one embodiment of the invention, there is provided a process wherein at least one composition of the invention can be applied to a first substrate or, optionally, can be applied to two or more substrates, wherein each substrate can be independently selected from the group consisting of a wood material, a metallic material, a plastic material, an elastomeric material, a composite material, a paper material, a wood material, a fabric material, a glass material, a foamed material, a metal, a mesh material, a leather material, a synthetic leather material, a vinyl material, poly(acrylonitrile butadiene styrene) (ABS), polypropylene (PP), glass filled PP, talc filled PP, impact-modified PP, polycarbonate (PC), PC-ABS, urethane elastomers, thermoplastic polyolefin (TPO) compounds, pigmented TPO compounds, filled TPO compounds, rubber-modified TPO compounds, a primed (painted) material.

In one embodiment of this invention, there is provided a process wherein at least one composition of the invention can be applied to a first substrate or, optionally, can be applied to two or more substrates, wherein each substrate can be independently, wherein the first substrate and the second substrate can each be independently selected from the group consisting of poly(acrylonitrile butadiene styrene) (ABS); polycarbonate (PC); PC-ABS blends; thermoplastic polyolefins such as polypropylene (PP); textiles, e.g., fabric materials, mesh, wood, wovens, and/or nonwovens; foam materials; leather materials; vinyl materials; and/or others that would be apparent to one of ordinary skill in the art. These materials can be used with or without fillers such as talc, glass, etc. as described herein.

In one embodiment of the invention, there is process wherein at least one adhesive composition of the invention can be applied to a first substrate and, optionally, can be applied to a second substrate and can each be independently selected from a polyester composite, a glass composite, or a wood-plastic composite.

In one embodiment of the invention, there is provided a process wherein at least one composition of the invention can be applied to a first substrate or, optionally, can be applied to two or more substrates, wherein each substrate can be independently selected from the group consisting of cast polypropylene, metallized polypropylene, foil laminated polypropylene, polyethylene terephthalate (PET), metallized PET, foil laminated PET, oriented PET, biaxially oriented PET, extruded PET, low density polyethylene (LDPE), oriented polypropylene, biaxially oriented polypropylene (BOPP), nylon, ethylene vinyl alcohol, and extruded films.

In one embodiment, there is provided an article of manufacture comprising at least one composition of the invention and/or processed by any of the processes of the invention.

In one embodiment, there is provided an article of manufacture comprising at least one composition of the invention and further comprising one or more substrates or two or more substrates, e.g., flexible substrates, assembly part substrates, automobile interior substrates, woodworking substrates, furniture part substrates, etc. "Flexible substrate" is defined herein as a substrate that is less than 10 mil thick. "Flexible film" is defined herein as a film that is less than 10 ml thick. "Flexible film substrate" is defined herein as a film substrate that is less than 10 mil thick.

In one embodiment, there is provided an article of manufacture comprising at least two substrates wherein at least one composition of the invention is applied to the first substrate and wherein the second substrate can be contacted with said composition.

In one embodiment, there is provided an article of manufacture which is layered with multiple substrates wherein at least one composition of the invention is layered between at least two of said substrates.

In one embodiment, there is provided an article of manufacture comprising at least one composition of the invention which is a laminate structure.

In one embodiment, there is provided an article of manufacture wherein at least one composition of the invention is applied to at least one surface of a multi-laminated structure.

In one embodiment, the substrates used in the articles of manufacture of the invention can be flexible film substrates comprising at least one composition of the invention.

In one embodiment, there is provided a process for preparing a flexible laminate comprising: (1) applying at least one of Components (I)-(III) of the compositions of the invention independently on the surface of a first flexible substrate, (2) applying the remaining component(s) of said Components (I)-(III) independently on the surface of a second flexible substrate, and (3) combining said substrates and then curing said combined components, thus forming a cured composition.

In one embodiment, the articles of manufacture of the invention can be assembly components or parts including but not limited to automobile parts, woodworking parts, and/or furniture parts comprising at least one composition of the invention.

In one embodiment, the article of manufacture of the invention can comprise an adhesive. The adhesive compositions of the invention can comprise any one of the compositions of the invention. In one embodiment, the adhesive compositions of the invention can be reactive adhesives. In one embodiment, the adhesive compositions of the invention can be curable or cured.

In one embodiment, any of the adhesive compositions of the invention can be applied to a substrate at any thickness known in the art for a particular application, for example, from about 0.5 microns to about 50 microns, or from about 0.5 microns to 5 microns, for example, for some flexible packaging applications.

In one embodiment, any of the adhesive compositions of the invention can be applied to a substrate at any thickness known in the art for a particular application, including but not limited to 50 to 200 microns or 50 to 150 microns or 75 to 125 microns, for example, for some assembly applications such as auto assembly or woodworking assembly.

The compositions of this invention can provide desirable properties for a variety of applications. In certain embodiments, the compositions of this invention are suitable for applications in the adhesives area, for example, automotive adhesives, structural adhesives, wood adhesives, and laminating adhesives, and applications in the coatings area, for example, automotive, industrial maintenance, marine craft, field-applied coatings, and furniture.

In one embodiment, any of the adhesive compositions of the invention can be selected from at least one of the following: automotive interior adhesive, flexible laminating adhesive, rigid laminating adhesive, assembly adhesive, labelling adhesive, nonwoven adhesive, tape adhesive, structural adhesive, hygiene nonwoven construction adhesive, hygiene elastic attachment adhesive, home repair adhesive, industrial adhesive, construction adhesive, furniture adhesive, medical adhesive, contact adhesive, hot melt adhesive, solvent-based adhesive, packaging adhesive, product assembly adhesive, woodworking adhesive, flooring adhesive, automotive assembly adhesive, structural adhesive, pressure sensitive adhesive (PSA), PSA tape, PSA label, PSA protective film, laminating adhesive, flexible packaging adhesive, hygiene core integrity adhesive, packaging adhesive, and hygiene core integrity adhesive.

In one embodiment, there is provided an article of manufacture comprising at least one composition of the invention selected from the group consisting of: an adhesive, a laminate, a tape, a label, a tag, a radio frequency identification (RFID) tag, a coating, a sealant, a film (whether or not flexible), a foam, a potting compound, a disposable hygiene article, a polyester composite, a glass composite, a fiberglass reinforced plastic, a wood-plastic composite, an extruded compound, a polyacrylic blended compound, a potting compound, a rubber compound, a motor vehicle molded part, a motor vehicle extruded part, a motor vehicle laminated part, a furniture part, sheet molding compound (SMC), dough molding compound (DMC), textiles (e.g. fabric materials, mesh, wovens and/or nonwovens) and/or a flexible packaging multilayer.

In some embodiments, such as pressure sensitive adhesives, the curable compositions of the present invention can be characterized by adhesive strength by 180-degree peel test e.g. according to ISO 8510-2-2006 Part 2 at 5 mm/sec or PSTC-101 Method A, cohesive strength and/or temperature resistance by static shear hold power testing (room temperature or elevated temperature, e.g., 40° C. or 70° C.) by PSTC-107 and/or by shear adhesion failure temperature (SAFT) by PSTC-17.

In one embodiment, the articles of manufacture of the invention can be coating compositions.

Formulations based on such acetoacetylated compounds, e.g., polyesters and aldehyde compounds, are especially suitable for low-temperature curing adhesive applications without the use of isocyanates.

The compositions of the present invention may be prepared according to any suitable method, techniques and equipment. For example, the components of the composition may be blended in a mixer, an extruder, an aluminum can, and/or at the point of application, e.g. a head mixing system. In some cases, the components of the composition may be blended, optionally with a solvent, to form a mixture, which can then be cast onto a backing or other substrate and dried or partially cured to form an article comprising the curable composition.

Furthermore, the composition may be shaped into a desired form, such as a tape or sheet, by an appropriate technique including casting, extrusion, or roll coating techniques (gravure, reverse roll, etc.). Alternatively, the composition may be applied to a substrate using conventional adhesive application equipment recognized in the art, e.g. curtain coating, slot-die coating, wire-wound rod coating, gravure coating, roll coating, knife coating, hot or "warm" melt coating. The composition may be applied as either a continuous or discontinuous coating or film or layer or sprayed through different nozzle and/or head configurations at different speeds using typical application equipment. The application may be followed by drying or heat treatment.

In another embodiment, the curable adhesive of the present invention is a laminating adhesive for flexible packaging. The curing temperature for such an adhesive is desirably a low temperature ranging from room temperature to about 50° C.

After formulation, the curable adhesive can be applied to a substrate and subsequently laminated to another substrate. Suitable substrates include but are not limited to textile, fabric, mesh, wood, film, poly(acrylonitrile butadiene styrene) (ABS), polypropylene (PP), glass-filled PP, talc-filled PP, impact-modified PP, polycarbonate (PC), PC-ABS, biaxially oriented polypropylene (BOPP), thermoplastic polyolefin (TPO) compounds, pigmented TPO compounds, filled TPO compounds, rubber-modified TPO compounds, paper, glass, plastic, metal, PVC (polyvinyl chloride), PET (polyethylene terephthalate), modified PET such as PETG (PET modified with 1,4-cyclohexanedimethanol) and PCTG, Mylar™ plastic, aluminum, leather, synthetic leather, vinyl, nonwoven materials, foams, painted surfaces, printed surfaces, thermosets, thermoplastics, polymer films such as polyethylene, polypropylene, oriented polyethylene, oriented polypropylene; metallized plastic films; aluminum foil; wood; metals such as aluminum, steel or galvanized sheeting; glass; urethane elastomers; primed (painted) substrates, and laminates, blends or coated substrates comprising at least one of these materials. Any of these substrates may be untreated, corona treated, chemically treated, plasma treated, flame treated, rubber-modified, impact-modified, filled with e.g. talc or glass, pigmented with e.g. carbon black, chromium oxide or titanium oxide, or otherwise modified as known by those skilled in the art to provide improved properties to the substrate.

The curable adhesive can be coated onto a substrate using techniques known in the art, for example, by spraying, draw-down, roll-coating, brushing, nozzle dispensing, printing, etc. and subsequently laminated to another substrate manually or by a roll-to-roll laminating machine. The coating and laminating process may be done at room temperature or elevated temperatures. The laminated films may be cured at room temperature or elevated temperatures. In various embodiments, the curable mixture of the present invention can cure at 20° C. in various amounts of time. In one embodiment, the curable mixture of the present invention can cure at 20° C. or higher in six days or less.

In some embodiments, the curable compositions of this invention can be partially cured before being applied to a substrate, used in a laminate, molded or otherwise incorporated into an article.

In some embodiments, the curable compositions of the present invention can be characterized by lap shear testing: ASTM D3163-01(2014) Standard Test Method for Determining Strength of Adhesively Bonded Rigid Plastic Lap-Shear Joints in Shear by Tension Loading. Impact strength can also be measured by any method known in the art, for example, by pendulum or ball drop impact tests.

In some embodiments, the curable compositions of the present invention can be used in flexible packaging and characterized by tests such as DIN ISO 53357 Internal Adhesion, DIN ISO 55529 Sealed Seam Strength, DIN 53357 Bonding Adhesion, DIN 53504 Elongation at Tear and Tearing Tension, ASTM D1003 Transparency of film, ASTM D2578 Wetting Tension of Film Surface, ASTM F1249 Water Vapor Transmission Rate, and/or ASTM F2622 or D3985 Oxygen Transmission Rate After formulation, the curable adhesive composition can be applied to one substrate to form an adhesive film. It can also be laminated to another substrate. Examples of substrates include paper; polymer films such as polyethylene, polypropylene, PET, oriented polyethylene, oriented polypropylene; metallized plastic films; aluminum foil; wood; metals such as aluminum, steel or galvanized sheeting; glass; urethane elastomers; primed (painted) substrates; and the like.

In one embodiment, the low-temperature curable composition can be suitable for laminating adhesive applications for flexible packaging for food including solventless and solvent-borne adhesives. The laminating adhesives of the invention can also be used in the areas of automotive, furniture, consumer goods, building and construction, and wood working.

Unpredictably, the compositions useful in this invention have a good combination of properties including but not limited to the ability to cure and/or crosslink, good aging resistance, good cure rate, good green strength, good peel strength, and ability to adhere to various substrates.

The following examples further illustrate how the polyesters useful in the invention can be made and evaluated, and how the adhesives can be made and evaluated, and are intended to be purely exemplary of the invention and are not intended to limit the scope thereof. Unless indicated otherwise, parts are parts by weight, temperature is in degrees C. (Celsius) or is at room temperature, and pressure is at or near atmospheric.

EXAMPLES

For the Examples herein, test methods and abbreviations are as follows:

Molecular weights are measured by gel permeation chromatography (GPC) using polystyrene equivalent molecular weight and are expressed in g/mol.

The glass transition temperature (Tg) and/or melting point of the polyesters is determined by differential scanning calorimetry using a TA Instruments DSC 2920.

T-peel testing was done according to ASTM F904-16 "Standard Test Method for Comparison of Bond Strength or Ply Adhesion of Similar Laminates Made from Flexible Materials" using an MTS Criterion Model 42, 100 Newton load cell. A minimum of three samples of each composition were tested and the average and standard deviation reported.

Example 1. Synthesis of Acetoacetate Functional Polyester 1 (AcAc Polyester 1)

Hydroxyl Functional Polyester 1:

A 2-L kettle with a four-neck lid was equipped with a mechanical stirrer, a thermocouple, a heated partial condenser (115° C.), a Dean-Stark trap, and a chilled condenser (15° C.). To the flask were charged neopentyl glycol (NPG) (255.9 g), 2-methyl-1,3-propanediol (MPDiol) (221.4 g), trimethylolpropane (TMP) (48.84 g), isophthalic acid (IPA) (348.9 g), adipic acid (AD) (306.9 g), and the acid catalyst, Fascat-4100 (Arkema Inc.) (1.31 g). The reaction was allowed to react under nitrogen at 170° C. for one hour, at 190° C. for one hour, and at 220° C. for about 3 hours to yield a clear, viscous mixture. A total of 148.8 g of the distillate was collected in the Dean-Stark trap. The resulting mixture was allowed to cool to room temperature and subsequently collected (1005 g). Acid number: <1.0 mgKOH/g; hydroxyl number: 102.4 mgKOH/g; glass transition temperature (Tg): −25.1° C.; number average molecular weight (Mn): 1797 g/mole; weight average molecular weight (Mw): 3791 g/mole.

Acetoacetate Functional Polyester 1:

To a 500 mL, three-neck, round-bottom flask equipped with a mechanical stirrer, a heated partial condenser, a Dean-Stark trap, and a water condenser were added the above hydroxyl-functional polyester 1 (100.0 g) and t-butyl acetoacetate (28.16 g). The mixture was gradually heated and allowed to react at 120° C. for 20 minutes and at 140° C. for two hours. A total of 15.5 ml of the condensate (t-butanol) was collected in the Dean-Stark adapter. The resulting viscous resin was allowed to cool and subsequently collected. Glass transition temperature (Tg): −28.5° C.; number average molecular weight (Mn): 1767 g/mole; weight average molecular weight (Mw): 3843 g/mole.

Example 2. Synthesis of Acetoacetate Functional Polyester 2 (AcAc Polyester 2)

Hydroxyl Functional Polyester 2:

A 500 mL three-neck round-bottom flask was equipped with a mechanical stirrer, a thermocouple, a heated partial condenser (105° C.), a Dean-Stark trap, and a water condenser. To the flask were charged NPG (43.2 g), MPDiol (37.3 g), TMP (13.08 g), IPA (62.3 g), AD (54.8 g), and the acid catalyst, Fascat-4100 (0.21 g). The reaction was allowed to react under nitrogen at 170° C. for one hour, at 200° C. for one hour, and at 230° for about 2 hours to yield a clear, viscous mixture. A total of 25 g of the distillate was collected in the Dean-Stark trap. The resulting mixture was allowed to cool to room temperature and subsequently collected (173 g). Acid number: <1.0 mgKOH/g; glass transition temperature (Tg): −12° C.; number average molecular weight (Mn): 2657 g/mole; weight average molecular weight (Mw): 7816 g/mole.

Acetoacetate Functional Polyester 2:

To a 500 mL, three-neck, round-bottom flask equipped with a mechanical stirrer, a heated partial condenser, a Dean-Stark trap, and a water condenser were added the above hydroxyl-functional polyester 2 (100.0 g) and t-butyl acetoacetate (28.16 g). The mixture was gradually heated and allowed to react at 120° C. for 20 minutes and at 140° C. for two hours. A total of 13.5 ml of the condensate (t-butanol) was collected in the Dean-Stark adapter. The resulting viscous resin was allowed to cool and subsequently collected. Glass transition temperature (Tg): −24.4° C.; number average molecular weight (Mn): 2698 g/mole; weight average molecular weight (Mw): 8077 g/mole.

Example 3. Synthesis of Acetoacetate Functional Polyester 3 (AcAc Polyester 3)

Hydroxyl Functional Polyester 3:

A 500 mL three-neck round-bottom flask was equipped with a mechanical stirrer, a thermocouple, a heated partial condenser (105° C.), a Dean-Stark trap, and a water condenser. To the flask were charged NPG (55.3 g), MPDiol (47.9 g), TMP (16.77 g), IPA (94.5 g), AD (83.1 g), and the acid catalyst, Fascat-4100 (0.28 g). The reaction was allowed to react under nitrogen at 170° C. for one hour, at 200° C. for one hour, and at 230° C. for about 2 hours to yield a clear, viscous mixture. A total of 35.5 g of the distillate was collected in the Dean-Stark trap. The resulting mixture was allowed to cool to room temperature and subsequently collected (227 g). Acid number: 2.3 mgKOH/g; glass transition temperature (Tg): −12.7° C.; number average molecular weight (Mn): 2962 g/mole; weight average molecular weight (Mw): 9724 g/mole.

Acetoacetate Functional Polyester 3:

To a 500 mL, three-neck, round-bottom flask equipped with a mechanical stirrer, a heated partial condenser, a Dean-Stark trap, and a water condenser were added the above hydroxyl-functional polyester 3 (150.0 g) and t-butyl acetoacetate (42.25 g). The mixture was gradually heated and allowed to react at 120° C. for 20 minutes and at 140° C. for two hours. A total of 18.8 ml of the condensate (t-butanol) was collected in the Dean-Stark adapter. The resulting viscous resin was allowed to cool and subsequently collected. Glass transition temperature (Tg): −23.9° C.; number average molecular weight (Mn): 2951 g/mole; weight average molecular weight (Mw): 9938 g/mole.

Example 4. Synthesis of Acetoacetate Functional Polyester 4 (AcAc Polyester 4)

Hydroxyl Functional Polyester 4:

A 500 mL three-neck round-bottom flask was equipped with a mechanical stirrer, a thermocouple, a heated partial condenser (105° C.), a Dean-Stark trap, and a water condenser. To the flask were charged NPG (115.5 g), TMP (17.44 g), IPA (83.1 g), AD (73.1 g), and the acid catalyst, Fascat-4100 (0.29 g). The reaction was allowed to react under nitrogen at 170° C. for one hour, at 200° C. for one hour, and at 230° C. for about 2 hours to yield a clear, viscous mixture. A total of 35.5 g of the distillate was collected in the Dean-Stark trap. The resulting mixture was allowed to cool to room temperature and subsequently collected. Acid number: 3.9 mgKOH/g; glass transition temperature (Tg): −8.8° C.; number average molecular weight (Mn): 2385 g/mole; weight average molecular weight (Mw): 7808 g/mole.

Acetoacetate Functional Polyester 4:

To a 500 mL, three-neck, round-bottom flask equipped with a mechanical stirrer, a heated partial condenser, a Dean-Stark trap, and a water condenser were added the above hydroxyl-functional polyester 4 (150.0 g) and t-butyl acetoacetate (42.25 g). The mixture was gradually heated and allowed to react at 120° C. for 20 minutes and at 140° C. for two hours. A total of 19.0 ml of the condensate (t-butanol) was collected in the Dean-Stark adapter. The resulting viscous resin was allowed to cool and subsequently collected. Glass transition temperature (Tg): −23°; number average molecular weight (Mn): 2478 g/mole; weight average molecular weight (Mw): 8125 g/mole.

Example 5. Synthesis of Acetoacetate Functional Polyester 5 (AcAc Polyester 5)

Hydroxyl Functional Polyester 5:

A 2-L kettle with a four-neck lid was equipped with a mechanical stirrer, a thermocouple, a heated partial condenser (115° C.), a Dean-Stark trap, and a chilled condenser (15° C.). To the flask were charged NPG (255.9 g), MPDiol (221.4 g), TMP (48.84 g), IPA (209.3 g), AD (429.7 g), and the acid catalyst, Fascat-4100 (1.10 g). The reaction was allowed to react under nitrogen at 170° C. for one hour, at 190° C. for one hour, and at 220° C. for about 3 hours to yield a clear, viscous mixture. A total of 149.2 g of the distillate was collected in the Dean-Stark trap. The resulting mixture was allowed to cool to room temperature and subsequently collected (986 g). Acid number: <1.0 mgKOH/g; hydroxyl number: 121.8 mgKOH/g; glass transition temperature (Tg): −38.1° C.; number average molecular weight (Mn): 1868 g/mole; weight average molecular weight (Mw): 4048 g/mole.

Acetoacetate Functional Polyester 5:

To a 500 mL, three-neck, round-bottom flask equipped with a mechanical stirrer, a heated partial condenser, a Dean-Stark trap, and a water condenser were added the above hydroxyl-functional polyester 5 (100.0 g) and t-butyl acetoacetate (28.16 g). The mixture was gradually heated and allowed to react at 120° C. for 20 minutes and at 140° C. for two hours. A total of 14.5 ml of the condensate (t-butanol) was collected in the Dean-Stark adapter. The resulting viscous resin was allowed to cool and subsequently collected. Glass transition temperature (Tg): −41.7° C.; number average molecular weight (Mn): 1922 g/mole; weight average molecular weight (Mw): 4800 g/mole.

Example 6. Formulation and Evaluation of Solvent-Borne Adhesive

An adhesive formulation was prepared by mixing AcAc polyester 1 (60% in ethyl acetate, 9 g), the curing agent CHDAL, (a mixture of 1,3- and 1,4-cyclohexanedicarboxaldehyde, 0.66 g), and the catalyst DBU (1,8-diazabicyclo-[5.4.0]undec-7-ene) in n-propanol (25 weight %, 0.48 g). The formulation contained DBU at 2 weight % based on the total weight of the polyester and CHDAL. The resulting formulation was drawn down on 2 sheets of polyester film with setting of 20 micron wet thickness. The films were allowed to dry for one hour at RT; each of them was then laminated to an un-coated polyester film. The laminated films were then allowed to cure at RT for one day and one week respectively. The cured films were cut into strips of 1 inch×10 inch (2.54 cm×25.4 cm) for peel strength test by INSTRON (model 4201). The peel strength was determined to be 2 lb/inch (909 g/inch or 357 g/cm) after one day and about the same value after one week.

Example 7. Adhesive Formulations with DBU in Various Alcohols

The alcohols 1-butanol, ethanol, and methanol were used to replace n-propanol in the 25 weight % DBU in alcohol solution used Example 6 to study the effect on the adhesive stability. The results are described below:

1. DBU in 1-butanol: Formulation became gel in about 3 hours.
2. DBU in ethanol: Formulation became gel in about 3 hours.
3. DBU in methanol: Formulation remained fluid over several days and did not show significant viscosity increase.

In Examples 8-11, a series of liquid-like AcAc polyesters with various compositions were prepared. These polyesters flow well at room temperature and are suitable for solventless adhesive formulations.

Example 8. Synthesis of Acetoacetate Functional Polyester 6 (AcAc Polyester 6)

Hydroxyl Functional Polyester 6:

A 2-L kettle with a four-neck lid was equipped with a mechanical stirrer, a thermocouple, a heated partial condenser (115° C.), a Dean-Stark trap, and a chilled condenser (15° C.). To the flask were charged 1,6-hexanediol (290.4 g), MPDiol (221.4 g), TMP (48.84 g), AD (613.8 g), and the acid catalyst, Fascat-4100 (0.84 g). The reaction was allowed to react under nitrogen at 170° C. for 2 hours and at 220° C. for about 3 hours to yield a clear, viscous mixture. A total of 144 g of the distillate was collected in the Dean-Stark trap. The resulting mixture was allowed to cool to room temperature and subsequently collected (1003 g). Acid number: <1.0 mgKOH/g; hydroxyl number: 128.5 mgKOH/g; glass transition temperature (Tg): −66.6° C.; number average molecular weight (Mn): 1865 g/mole; weight average molecular weight (Mw): 4047 g/mole.

Acetoacetate Functional Polyester 6:

To a 500 mL, three-neck, round-bottom flask equipped with a mechanical stirrer, a heated partial condenser, a Dean-Stark trap, and a water condenser were added the above hydroxyl-functional polyester 6 (100.0 g) and t-butyl acetoacetate (28.16 g). The mixture was gradually heated and allowed to react at 120° C. for 20 minutes and at 140° C. for two hours. A total of 15 ml of the condensate (t-butanol) was collected in the Dean-Stark adapter. The resulting viscous resin was allowed to cool and subsequently collected. Glass transition temperature (Tg): −64.7° C.; number average molecular weight (Mn): 1667 g/mole; weight average molecular weight (Mw): 3933 g/mole.

Example 9. Synthesis of Acetoacetate Functional Polyester 7 (AcAc Polyester 7))

Hydroxyl Functional Polyester 7:

A 500 mL three-neck round-bottom flask was equipped with a mechanical stirrer, a thermocouple, a heated partial condenser (105° C.), a Dean-Stark trap, and a water condenser. To the flask were charged NPG (246.1 g), MPDiol (212.9 g), TMP (46.96 g), AD (548.0 g), and the acid catalyst, Fascat-4100 (0.29 g). The reaction was allowed to react under nitrogen at 170° C. for one hour, at 200° C. for one hour, and at 230° C. for about one hour to yield a clear, viscous mixture. A total of 135 g of the distillate was collected in the Dean-Stark trap. The resulting mixture was allowed to cool to 100° C. for the next step. Acid number: 1.5 mgKOH/g.

Acetoacetate Functional Polyester 7:

To the above hydroxyl functional polyester (7) was added t-butyl acetoacetate (259.11 g). The mixture was heated and allowed to react at 1200 for 20 minutes and at 140° C. for two hours. A total of 115.4 g of the condensate (t-butanol) was collected in the Dean-Stark adapter. The resulting viscous resin was allowed to cool and subsequently collected. Glass transition temperature (Tg): −59.6° C.; number average molecular weight (Mn): 1169 g/mole; weight average molecular weight (Mw): 2588 g/mole.

Example 10. Synthesis of Acetoacetate Functional Polyester 8 (AcAc Polyester 8)

Hydroxyl Functional Polyester 8:

A 500 mL three-neck round-bottom flask was equipped with a mechanical stirrer, a thermocouple, a heated partial condenser (105° C.), a Dean-Stark trap, and a water condenser. To the flask were charged NPG (246.1 g), 1,6-hexanediol (279.2 g), TMP (46.96 g), AD (548.0 g), and the acid catalyst, Fascat-4100 (0.29 g). The reaction was allowed to react under nitrogen at 170° C. for one hour, at 200° C. for one hour, and at 230° C. for about one hour to yield a clear, viscous mixture. A total of 132 g of the distillate was collected in the Dean-Stark trap. The resulting mixture was allowed to cool to 100° C. for the next step. Acid number: 1.9 mgKOH/g.

Acetoacetate Functional Polyester 8:

To the above hydroxyl functional polyester (8) was added t-butyl acetoacetate (277.80 g). The mixture was heated and allowed to react at 120° C. for 20 minutes and at 140° C. for two hours. A total of 125.6 g of the condensate (t-butanol) was collected in the Dean-Stark adapter. The resulting viscous resin was allowed to cool and subsequently collected. Glass transition temperature (Tg): −64.7° C.; number average molecular weight (Mn): 1404 g/mole; weight average molecular weight (Mw): 3011 g/mole.

Example 11. Synthesis of Acetoacetate Functional Polyester 9 (AcAc Polyester 9)

Hydroxyl Functional Polyester 9:

A 500 mL three-neck round-bottom flask was equipped with a mechanical stirrer, a thermocouple, a heated partial condenser (105° C.), a Dean-Stark trap, and a water condenser. To the flask were charged MPDiol (52.7 g), polyethylene glycol (PEG 200) (117.0 g), TMP (11.63 g), AD (146.1 g), and the acid catalyst, Fascat-4100 (0.33 g). The reaction was allowed to react under nitrogen at 17000 for one hour, at 20° C. for one hour, and at 2300 for about one hour to yield a clear, viscous mixture. A total of 36.1 g of the distillate was collected in the Dean-Stark trap. The resulting mixture was allowed to cool to 100° C. for the next step.

Acetoacetate Functional Polyester 9:

To the above hydroxyl functional polyester (9) was added t-butyl acetoacetate (82.18 g). The mixture was heated and allowed to react at 120° for 20 minutes and at 140° C. for two hours. A total of 46.5 mL of the condensate (t-butanol) was collected in the Dean-Stark adapter. The resulting viscous resin was allowed to cool and subsequently collected. Glass transition temperature (Tg): −54.8° C.; number average molecular weight (Mn): 2017 g/mole; weight average molecular weight (Mw): 4984 g/mole.

Example 12. Formulation and Evaluation of Solventless Adhesive

An adhesive formulation was prepared by using liquid-like AcAc polyester 6 (100% solids, 4 g) without solvents, CHDAL (0.5 g), and DBU (0.09 g). The formulation had DBU at 2 weight % based on the total weight of the polyester and CHDAL. The resulting adhesive formulation was drawn down on 2 sheets of polyester film with setting of 10 micron wet thickness. The films were allowed to dry for one hour at RT; each of them was then laminated to an un-coated polyester film. The laminated films were then allowed to cure at RT for one day. The cured films were cut into strips of 1 inch×10 inch (2.54 cm×25.4 cm) for peel strength test by INSTRON (model 4201). The peel strength was determined to be 0.49 lb/inch (223 g/inch or 88 g/cm) after one day.

Example 13. Synthesis of Acetoacetate Functional Polyesters 10-12 (AcAc Polyesters 10-12)

AcAc polyesters 10-12 (Table 1) were prepared in accordance with Example 1, in which the equivalent (eq.) ratio of the branching agent, trimethylolpropane (TMP), was increased respectively from 10 to 20, 25, and 30%, based on the total hydroxyl components. As described in Example 1, the AcAc polyesters were prepared by converting the corresponding hydroxyl functional polyesters to yield AcAc number 100 mgKOH/g.

TABLE 1

Acetoacetate Functional Polyester Compositions

| | Hydroxyl Functional Polyester Composition as Charged | | | | | | |
|---|---|---|---|---|---|---|---|
| | Eq. Ratio Based on Total Alcohols (%) | | | Eq. Ratio Based on Total Acids (%) | | eq. of OH/eq. | |
| | NPG | MPDiol | TMP | AD | IPA | of COOH | AcAc # |
| AcAc polyester 10 | 40 | 40 | 20 | 50 | 50 | 1.3 | 100 |
| AcAc polyester 11 | 37.5 | 37.5 | 25 | 50 | 50 | 1.3 | 100 |
| AcAc polyester 12 | 35 | 35 | 30 | 50 | 50 | 1.3 | 100 |

TABLE 2

Acetoacetate Functional Polyester Properties

| | Hydroxyl Functional Polyester Properties | | | | | AcAc Polyester Properties | | |
|---|---|---|---|---|---|---|---|---|
| | Tg, °C | Mn (g/mol) | Mw (g/mol) | Acid Number Analyzed | OH Number Analyzed | Tg, °C | Mn (g/mol) | Mw (g/mol) |
| AcAc polyester 10 | −13 | 2294 | 6463 | 1.7 | — | −27 | 2208 | 6583 |
| AcAc polyester 11 | −11 | 2575 | 8800 | <1 | 127 | −26 | 2482 | 9209 |
| AcAc polyester 12 | −10 | 2990 | 4042 | <1 | 119 | −26 | 2916 | 19282 |

Example 14. Synthesis of Triacetoacetate Adduct (TMP triAcAc)

A 500 mL three-neck round-bottom flask was equipped with a mechanical stirrer, a thermocouple, a heated partial condenser (105° C.), a Dean-Stark trap, and a water condenser. To the flask were charged TMP (50.0 g), t-butyl acetoacetate (167.8 g), and the catalyst, Fascat 4100, 0.22 g. The mixture was heated and allowed to react at 120° C. for 20 minutes and at 140° C. for two hours. A total of 103 mL of the condensate (t-butanol) was collected in the Dean-Stark adapter. The resulting mixture was allowed to cool and the liquid product (TMP triAcAc) collected.

Example 15. Formulation of Solvent-Borne Adhesives Containing Reactive Diluent

Adhesive formulations were prepared by mixing AcAc polyester 10-12 (50% in methyl amyl ketone, 8 g), TMP triAcAc prepared in Example 12 (1 g), CHDAL curing agent (1.04 g), and DBU catalyst in methanol (25 weight %, 0.97 g). The formulations were formulated to have AcAc polyester/TMP triAcAc=80/20 by weight and DBU at 4 weight % based on the total weight of the polyester, TMP triAcAc, and CHDAL.

Example 16. Synthesis of Acetoacetate Functional Polyester 13

Hydroxyl Functional Polyester 13:
A 10-gallon reactor was equipped with a heating mantle, mechanical stirrer, a thermocouple, a vapor heated partial condenser, a condensate trap, and a water cooled condenser (17-20° C.). To the reactor were charged NPG (5688 g), MPDiol (4922 g), TMP (1085 g), IPA (7801 g), AD (6862 g), and the acid catalyst, Fascat-4100 (26.4 g). The reaction was heated under nitrogen flow of 1 scfh to 140° before starting agitation and held there for 5 minutes. The temperature was increased to 170° C. at a rate of 1° C./min and held there for two hours, then increased to 230° C. at a rate of 0.5° C./min. The temperature was held at 230° C. until an acid number of −1 mgKOH/g was achieved. A total of 3330 g of the distillate was collected in the trap. The resulting mixture was cooled to 100° C. for the next step and sampled and found to have the following properties: acid number of 1.2 mgKOH/g; hydroxyl number of 114 mgKOH/g; glass transition temperature (Tg) of −23° C.; number average molecular weight (Mn) of 1651 g/mole; and weight average molecular weight (Mw) of 3733 g/mole.

Acetoacetate Functional Polyester 13:
To the above hydroxyl functional polyester (13) was added t-butyl acetoacetate (6477 g). The mixture was heated and allowed to react at 1200 for 20 minutes and at 140° C. for three hours. A total of 2390 g of the condensate (t-butanol) was collected. The resulting viscous resin was allowed to cool and subsequently sampled and found to have the following properties: glass transition temperature (Tg) of −37° C.; number average molecular weight (Mn) of 1675 g/mole; weight average molecular weight (Mw) of 3813 g/mole; and AcAc number of 90 mgKOH/g.

Example 17. Formulation and Evaluation of Solvent-Borne Adhesive

An adhesive formulation was prepared by mixing AcAc polyester 13 (26.5 g), CHDAL (2.84 g); DBU in methanol (25 weight %, 1.76 g); and ethyl acetate solvent (21.2 g). The adhesive had 1) 57 wt % solids, 2) DBU at 1.5 weight % based on the total weight of the polyester and CHDAL and 3) a 0.95 equivalent ratio of the aldehyde (CHO) functional groups on the CHDAL curing agent to acetoacetate (AcAc) functional groups on the polyester The resulting composition was used to laminate two sheets of polyester film (1 mil thickness, Mitsubishi) in the following manner. The composition was coated onto the substrate using a TMI Automatic Drawdown Machine, Model KCC-101 and a Meyer rod #1. The coated substrate was placed in an oven at 60° C. for 1 minute. The second film was then placed on top of the coated substrate, and the structure was laminated using a laminator (Scotch® TL906 Smart Thermal Laminator, Office Depot). The laminated film had a (dry) coat weight of ~1-2 gsm (grams per square meter). The laminated films were then allowed to cure at RT before t-peel bond strength testing after one day and one week of curing.

This composition was prepared, hand laminated, and tested 15 separate times with the results shown in Table 3.

TABLE 3

T-peel bond strength of PET-to-PET film laminates cured at RT from formulated compositions based on AcAc functional polyester 13

| Replicate | T-peel bond strength, g/25 mm (standarddeviation) | | | |
|---|---|---|---|---|
| | Cured 1-day | Failure mode | Cured 1-week | Failure mode |
| A | 287 (39) | Coh/SF | 191 (45) | Coh/SF |
| B | 396 (44) | Coh/SF | 221 (10) | Coh/SF |
| C | 329 (14) | Coh/SF | 257 (40) | Coh/SF |
| D | 377 (87) | Coh/SF | 194 (3) | Coh/SF |
| E | 372 (23) | Adhesive | 36 (6) | Coh/SF |
| F | 248 (40) | SF | 162 (17) | Partial SF |
| G | 321 (55) | SF | 210 (15) | Partial SF |
| H | 328 (51) | SF | 233 (43) | Partial SF |
| I | 240 (50) | Coh/SF | 187 (43) | Partial SF |
| J | 275 (42) | SF | 158 (21) | Coh/SF |
| K | 259 (24) | SF | 128 (26) | Cohesive |
| L | 244 (29) | SF | 123 (8) | Coh/P. SF |
| M | 249 (30) | SF | 160 (12) | Partial SF |
| N | 221 (14) | SF | 168 (25) | Partial SF |
| O | 285 (37) | SF | 198 (22) | Partial SF |
| Average | 295 (55) | — | 185 (38) | — |

(Coh means cohesive failure. SF means substrate failure. P. SF means partial substrate failure.)

Example 18. Comparison with Commercial PU Solvent-Borne Adhesive

For comparison purposes, a commercial solvent-borne polyurethane (PU) adhesive was obtained from Dow Chemical Company, USA. This two-component (2K) laminating adhesive consisted of: 1) Adcote™ 555 and 2) Adcote™ 536B with a recommended mix ratio of 100 parts by weight 555 to 13 parts by weight 536B and was supplied by the vendor at 70 wt % solids. To reduce application viscosity and aid in comparison, additional ethyl acetate solvent was added to obtain 50 wt % solids using the following formulation recipe: 1) Adcote™ 555 (25 g), 2) Adcote™ 536B (3.25 g), and 3) ethyl acetate (11.75 g).

The resulting PU adhesive formulation was prepared, hand laminated, and tested 15 separate times as described in Example 17 with the results shown in Table 4.

TABLE 4

T-peel bond strength of PET-to-PET film laminates cured at RT from commercial PU adhesive

| Replicate | T-peel bond strength, g/25 mm (standard deviation) | | | |
|---|---|---|---|---|
| | Cured 1-day | Failure mode | Cured 1-week | Failure mode |
| A | 288 (27) | Coh/SF | 196 (25) | SF |
| B | 334 (63) | Coh/SF | 206 (49) | SF |
| C | 338 (6) | Coh/SF | 229 (35) | SF |
| D | 385 (35) | Coh/SF | 198 (30) | SF |
| E | 315 (35) | Coh/SF | 273 (27) | SF |
| F | 360 (55) | SF | 195 (15) | Partial SF |
| G | 246 (50) | Coh/SF | 230 (40) | Coh/SF |
| H | 240 (27) | SF | 243 (23) | SF |
| I | 288 (17) | Coh/SF | 221 (60) | Partial SF |
| J | 337 (65) | SF | 183 (24) | Coh/SF |
| K | 367 (79) | SF | 225 (24) | SF |
| L | 310 (63) | SF | 197 (30) | Partial SF |
| M | 244 (38) | SF | 193 (46) | Partial SF |
| N | 255 (27) | SF | 221 (33) | Partial SF |
| O | 325 (26) | SF | 152 (22) | Coh/P. SF |
| Average | 308 (47) | — | 210 (28) | — |

(Coh means cohesive failure. SF means substrate failure. P. SF means partial substrate failure.)

Unpredictably, the performance of the solvent-borne curable acetoacetylated polyester adhesive from this invention (Table 3) was equivalent to that of the commercial 2K PU adhesive (Table 4).

Examples 19-23: Addition of Solid Tackifier Resins with Varying Polarity

Compositions were prepared in the amounts shown in Table 5 where the following tackifier resins were included as finely ground particles in the curable compositions: Permalyn™ 6110, a pentaerythritol ester of gum rosin, acid number of 13 mg KOH/g; Permalyn™ 2095, a glycerol ester of gum rosin, acid number of 8 mg KOH/g; Foralyn™ 90, a hydrogenated glycerol ester of gum rosin, acid number of 6 mg KOH/g; and Kristalex™ 3070, an aromatic hydrocarbon (pure monomer) resin, acid number of 0 mg KOH/g, all from Eastman Chemical Company, Kingsport, Tenn., USA.

Each curable composition containing tackifier resin was mixed and poured between two sheets of 2 mil untreated polyethylene terephthalate (PET) film separated with 4.5 mil RP12 release paper (ChemInstruments, OH, USA) as spacers to form a laminate with 2-4 mils adhesive thickness. The laminate was cured for 20 seconds at 110° C. in a heated Carver press. The laminates were post-cured for 24 hours at room temperature, 60° C. or 120° C., and then the bond strength was tested. Rectangular strips measuring 1"×10" of each composition were tested at 5 mm/s (12 inch/minute) crosshead displacement rate using an MTS Criterion Universal Tensile Tester model C43-104E (MTS Systems Corporation, Eden Prairie, Minn., US). A minimum of three samples of each composition were tested and the average and standard deviation reported in Newtons per meter (N/m). Unpredictably, even when the ring and ball softening point of the tackifier resin was not passed during the cure profile, it was found that the laminate bond strength was significantly improved after post-cure when tackifier resin is present in the composition compared to Example 8, which did not have tackifier added.

TABLE 5

Curable Compositions Comprising Tackifier Resins and Determination of Bond Strength (standard deviation in parentheses)

| | Example Number | | | | |
|---|---|---|---|---|---|
| | 19 | 20 | 21 | 22 | 23 |
| Resin 1 (g) | 100 | 100 | 100 | 100 | 100 |
| CHDAL (g) | 10 | 10 | 10 | 10 | 10 |
| DBU (g) | 1.2 | 2 | 2 | 2 | 2 |
| Permalyn ™ 6110 tackifier resin | 5 g | — | — | — | — |
| Permalyn ™ 5095 tackifier resin | — | 5 g | — | — | — |
| Kristalex ™ 3070 tackifier resin | — | — | 5 g | — | — |
| Foralyn ™ 90 tackifier resin | — | — | — | 5 g | — |
| PET/PET Laminate bond testing with cure conditions* | | | | | |
| T-peel, 24 hrs, RT (N/m) | 25 (3) | 38 (5) | 32 (8) | 40 (5) | 41 (6) |
| T-peel, 24 hrs, 60° C. (N/m) | 61 (11) | 39 (7) | 38 (8) | 28 (8) | 34 (1) |
| T-peel, 24 hrs, 120° C. (N/m) | 92 (31) | 93 (24) | 79 (24) | 86 (29) | 70 (16) |

*T-peel tests were done as described in PSTC-101 Method A, following 24 hour curing at the listed temperature.

The invention has been described in detail with reference to the embodiments described herein, but it will be understood that variations and modifications can be effected within the scope of the invention.

What is claimed is:

1. A curable adhesive composition comprising:
   I. Component (I) comprising at least one amorphous or semi-crystalline polyester or at least one polyether or combinations thereof having at least one or at least two functional groups selected from the group consisting of β-ketoester and malonate functional groups,
   II. Component (II) comprising at least one or at least two aldehyde functional groups or isomers thereof, and
   III. Component (III) comprising at least one basic catalyst, salts thereof, or combinations thereof.

2. The adhesive composition of claim 1 wherein said Component (I) is an acetoacetate functional polyester comprising the residues of
   a. a hydroxyl component comprising:
      i. a diol in an amount ranging from 50 to 95 mole %, based on the total moles of (i) and (ii), and
      ii. a polyol in an amount ranging from 5 to 50 mole %, based on the total moles of (i) and (ii);
   b. a carboxyl component comprising a polycarboxylic acid compound, a derivative of polycarboxylic acid compound, or a combination thereof; and
   c. an alkyl acetoacetate, a diketene, or a combination thereof in an amount ranging from about 5 to about 65 weight %, based on the total weight of (a), (b), and (c).

3. The adhesive composition of claim 2, wherein the diol component (a)(i) is in an amount ranging from about 60 to about 90 mole % and the polyol component (a)(ii) is in an amount ranging from about 10 to about 40 mole %.

4. The adhesive composition of claim 2, wherein the diol component (a)(i) is one or more selected from the group consisting of 2,2-dimethyl-1,3-propanediol (neopentyl glycol), 2-methyl-1,3-propanediol, 2-butyl-2-ethyl-1,3-propanediol, 1,4-butanediol, 1,6-hexanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2,2,4,4-tetramethylcyclobutane-1,3-diol, and polyethylene glycol.

5. The adhesive composition of claim 2, wherein the polyol component (a)(ii) is selected from 1,1,1-trimethylolpropane, 1,1,1-trimethylolethane, glycerin, sorbitol, and pentaerythritol or mixtures thereof.

6. The adhesive composition of claim 2, wherein the carboxyl component (b) is one or more selected from the group consisting of adipic acid, isophthalic acid (or dimethyl isophthalate), 1,4-cyclohexanedicarboxylic acid, 1,3-cyclohexanedicarboxylic acid, hexahydrophthalic anhydride, maleic anhydride, succinic anhydride, phthalic acid, and phthalic anhydride.

7. The adhesive composition of claim 2, wherein said alkyl acetoacetate is one or more selected from selected from t-butyl acetoacetate, methyl acetoacetate, ethyl acetoacetate, n-propyl acetoacetate, isopropyl acetoacetate, n-butyl acetoacetate, isobutyl acetoacetate, t-amyl acetoacetate, diisopropyl carbinol acetoacetate, or mixtures thereof.

8. The adhesive composition of claim 2, wherein said polyester (I) has a glass transition temperature (Tg) of about −65° C. to about −50° C.

9. The adhesive composition of claim 1 containing essentially no volatile solvents.

10. The adhesive composition of claim 1 wherein said polyester (I) has a glass transition temperature (Tg) of about −45° C. to −10° C.

11. The adhesive composition of claim 1 further comprising one or more organic solvents selected from the group comprising ethyl acetate, butyl acetate, xylene, methyl amyl ketone, methyl ethyl ketone, and toluene.

12. The adhesive composition of claim 1 wherein the curing agent (II) is a dialdehyde.

13. The adhesive composition of claim 1 wherein the basic catalyst is one or more selected from the group consisting of 1,8-diazabicyclo-[5.4.0]undec-7-ene, 1,5-diazabicyclo[4.3.0]non-5-ene, 1,5,7-triazabicyclo[4.4.0]dec-5-ene, 7-methyl-1,5,7-triazabicyclo[4.4.0]dec-5-ene, 1,1,3,3-tetramethylguanidine, 1,4-diazabicyclo[2.2.2]octane, triethylamine, N,N-dimethylethanolamine, ammonium hydroxide, triphenyl phosphine, and tributyl phosphine.

14. The adhesive composition of claim 1 wherein the basic catalyst is in an amount ranging from 0.5 to 5 weight % based on the total weight of Components (I) and (II).

15. The adhesive composition of claim 1, wherein said polyester is an acetoacetate functional polyester comprising the residues of
   d. a hydroxyl component comprising:
      i. a diol in an amount ranging from 60 to 90 mole %, based on the total moles of (i) and (ii); and
      ii. a polyol in an amount ranging from 10 to 40 mole %, based on the total moles of (i) and (ii);
   e. a carboxyl component comprising a polycarboxylic acid compound, a derivative of polycarboxylic acid compound, or a combination thereof; and
an alkyl acetoacetate, a diketene, or a combination thereof in an amount ranging from about 15 to about 30 weight %, based on the total weight of (a), (b), and (c).

16. The adhesive composition of claim 1 wherein the curing agent is selected from the group comprising 1,3-cyclohexanedicarboxaldehyde; 1,4-cyclohexanedicarboxaldehyde; mixtures of 1,3-cyclohexanedicarboxaldehyde; 1,4-cyclohexanedicarboxaldehyde; 2,6-norbornanedicarboxaldehyde; 2,5-norbornanedicarboxaldehyde; cyclododecane-1,4,8-tricarbaldehyde; 3-(4-formylcyclohexyl)propanal; tricyclodecane dialdehyde; o-phthalaldehyde; terephthalaldehyde; isophthalaldehyde; cyclopentane-1,3-dicarbaldehyde; cyclopenta-3,5-diene-1,3-dicarbaldehyde; glutaraldehyde; methylfurfural; furfural; or 5-(hydroxymethyl)furan-2-carbaldehyde; benzenedipropanal; or any isomers thereof; or mixtures thereof.

17. The adhesive composition of claim 1 wherein said polyester (I) is an acetoacetate functional polyester, Component (I) (II) is selected from 1,3-cyclohexanedicarboxaldehyde; 1,4-cyclohexanedicarboxaldehyde; mixtures of 1,3-cyclohexanedicarboxaldehyde; 1,4-cyclohexanedicarboxaldehyde; 2,6-norbornanedicarboxaldehyde; terephthalaldehyde, isophthalaldehyde, orthophthalaldehyde, cyclopenta-3,5-diene-1,3-dicarbaldehyde and tricyclodecane dialdehyde, or any isomers thereof or any combinations thereof.

18. The adhesive composition of claim 17 wherein the equivalent ratio of the acetoacetate (AcAc) functionality in the polyester (I) and the aldehyde functionality in the composition is from about 1.3 to about 0.7.

19. The adhesive composition of claim 1 further comprising an adduct having two or more β-ketoester functional groups selected from 2-methyl-1,3-propanediol diacetoacetate, neopentyl glycol diacetoacetate, 2,2,4,4-tetramethylcyclobutane-1,3-diacetoacetate, trimethylolpropane triacetoacetate, or mixtures thereof.

20. The adhesive composition of claim 1 comprising tackifiers, plasticizers, fillers, pigments, stabilizers, antioxidants, adhesion promoters, flame retardants, conductive agents, rheology modifiers and mixtures thereof.

* * * * *